United States Patent [19]
Csipkes et al.

[11] Patent Number: 6,101,423
[45] Date of Patent: Aug. 8, 2000

[54] METHOD AND APPARATUS FOR SORTING COMPONENTS

[75] Inventors: Andrei Csipkes, Savage; Henry H. Yaffe, Baltimore; Steve B. Alexander, Millersville; Balakrishnan Sridhar, Elkridge; Dave A. Schwarten, Ellicott City; Yves Pradieu, Columbia, all of Md.

[73] Assignee: CIENA Corporation, Linthicum, Md.

[21] Appl. No.: 09/008,070

[22] Filed: Jan. 16, 1998

[51] Int. Cl.[7] .................................................. G06F 15/40
[52] U.S. Cl. ............................................. 700/117; 395/500
[58] Field of Search .................................... 700/142, 103, 700/122, 107, 106, 100, 99, 97, 95, 117, 160; 438/14, 15; 395/500

[56] References Cited

U.S. PATENT DOCUMENTS

| | | | |
|---|---|---|---|
| 4,821,197 | 4/1989 | Kenik et al. | 700/142 |
| 5,311,437 | 5/1994 | Leal et al. | 700/142 |
| 5,339,247 | 8/1994 | Kirihara et al. | 700/142 |
| 5,504,687 | 4/1996 | Wolf | 700/122 |
| 5,838,965 | 11/1998 | Kavanagh et al. | 707/103 |

*Primary Examiner*—William Grant
*Assistant Examiner*—Kidest Bahta
*Attorney, Agent, or Firm*—Daniel N. Daisak; David L. Soltz

[57] ABSTRACT

The component parts for assembly of a device, such as the passive optical components of an optical amplifier, are automatically selected from among a supply of available component parts. Each component part has a performance parameter such as insertion loss associated therewith. Stored in a database memory are component part data for each component part of the supply of available component parts. The component part data are in a computer readable format and indicative of a type of each part and the performance parameter of each part. To obtain the selection of parts of the device for assembly, the component part data for a plurality of the available component parts is retrieved from the database, and the thus retrieved plurality of component part data are sorted according to at least the performance parameter of each retrieved component part data. At least one component part among the sorted component part data is selected based on a preset parameter. Then, at least one remaining component part among the sorted component part data is identified based at least on the performance parameter of the at least one component part and the performance parameter of the at least one remaining component part.

20 Claims, 20 Drawing Sheets

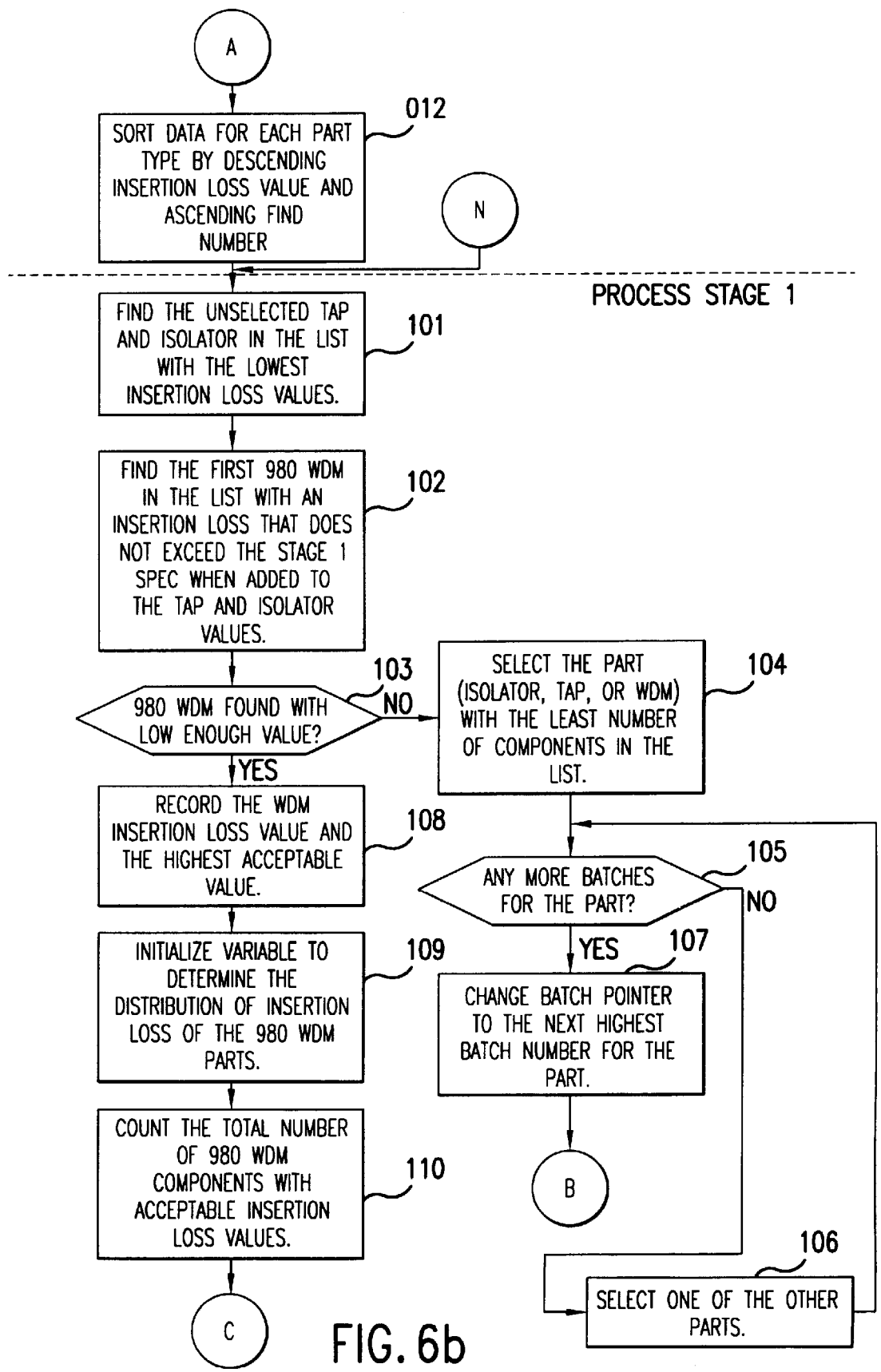

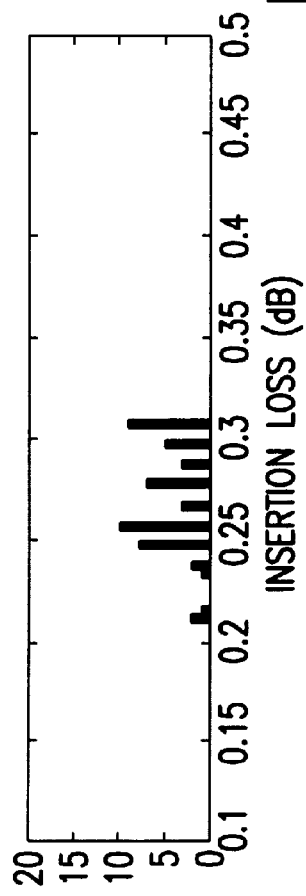
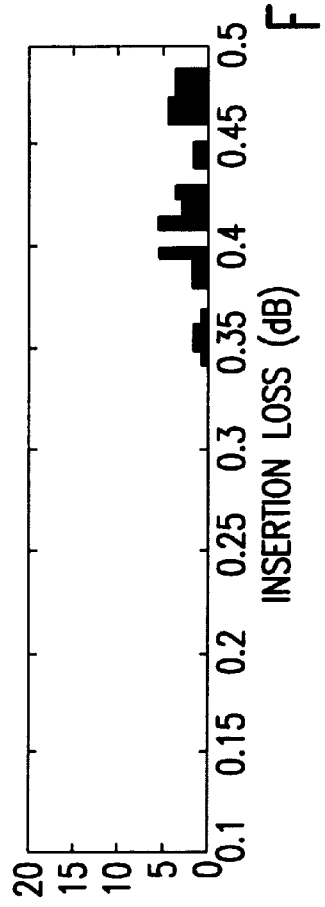
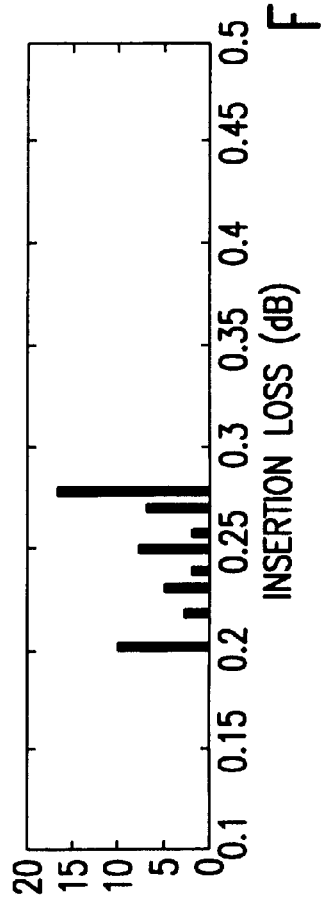
FIG. 8a
FIG. 8b
FIG. 8c

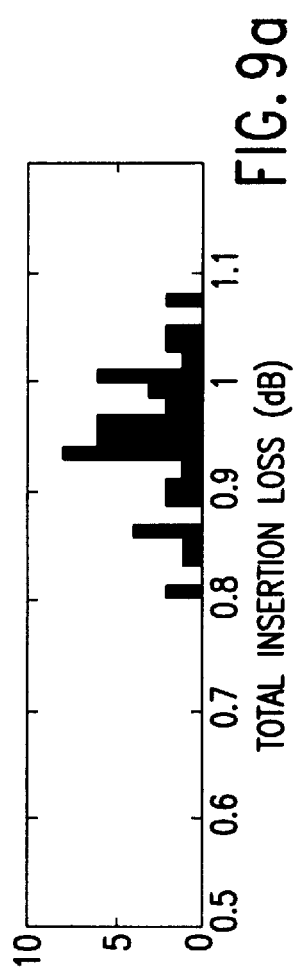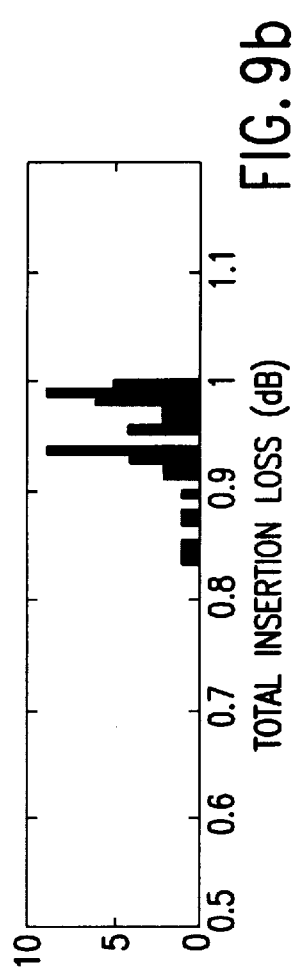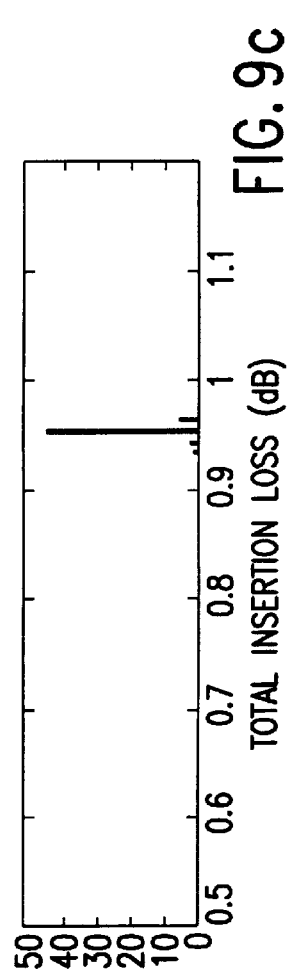

METHOD AND APPARATUS FOR SORTING COMPONENTS

BACKGROUND OF THE INVENTION

1. Field of the Invention

The present invention generally relates to a component part sorting and selection method and apparatus, and more particularly, to a method and apparatus for sorting and selecting component parts from a component part inventory to be used in the manufacture of a device so as to increase the utilization efficiency of the component inventory while at the same time substantially improving device yields. The invention is particularly suited to the manufacture of devices such as optical amplifiers formed from a number of discrete components each having a measured insertion loss.

2. Description of the Related Art

An optical amplifier is manufactured by assembling multiple components within an optical cassette. As shown in FIG. 1, the amplifier may include, for example, a tap 101, an isolator 102, a 1480 WDM (wave division multiplexer) 103, a 1550/1625 WDM 104, an isolator 105, a 980 WDM 106, an isolator 107 and a tap 108. An optical coupler 100 is positioned at the front end of the tap 101.

When the amplifier of FIG. 1 is to be manufactured, design specifications dictate a so-called "loss budget", i.e., a maximum end-to-end insertion loss. The actual end-to-end insertion loss will roughly equal the sum of the insertion losses of the components making up the amplifier. An amplifier which exceeds the loss budget is not acceptable and is either discarded or disassembled for recycling of parts. A typical loss budget for an optical amplifier is on the order of 3.5 dB.

The manufacturer of the amplifier builds an inventory of components by purchasing batches of the components from suppliers, each batch having a specified loss distribution. For example, as shown in FIG. 2, the insertion losses of a batch of 250 optical isolators may take on a bell-curve distribution with a mean of 0.38 dB. The price of each batch of components needed to construct the optical amplifier is negotiated at least partly based on its loss distribution. The further the loss distribution is located towards 0 dB, the more expensive the batch, and visa versa.

Suppose, for example, that isolators are required each having a loss of no more than about 0.38 dB. While the manufacturer can certainly purchase a batch of isolators having a loss distribution completely within the 0.38 dB limit (i.e., the entire bell curve falling below 0.38 dB), such would generally be cost prohibitive and would result in a large number of amplifiers being "overbuilt". That is, suppose further that each of the nine components forming the amplifier were purchased on the same basis. All resultant amplifiers would have an end-to-end insertion loss well below the loss budget. While this may be acceptable from an engineering point of view, it is not an economically sound practice. Thus, the manufacturer instead purchases a batch of isolators having a mean insertion loss of around 0.38 dB (such as that shown in FIG. 2), knowing that the isolators falling in the upper half of the bell curve exceed the desired maximum loss.

After building an inventory of batches of each component, the optical amplifiers are assembled, typically by selecting components from the inventory on a first-in first-out (FIFO) basis. This results in a random combination of insertion losses in the assembled amplifier. If the random selection results in a sufficient number of component losses on the lower half of the bell curve distribution, an acceptable amplifier may be obtained notwithstanding the presence of one or more components from the upper half of the bell curve. On the other hand, the random selection of too many components from the upper halves of the respective bell curves results in an amplifier which exceeds the loss budget. In practice, the randomness of the component selection results in a large number of unacceptable amplifiers, i.e., the resultant device yields are low.

Of course, it is possible to simply extract and assemble only those components from the lower half of the bell curve. However, this results in a supply of amplifiers which, on the whole, are overbuilt (in terms of insertion loss), as well as a large number of unused and wasted components, i.e., the utilization efficiency of the components is low.

SUMMARY OF THE INVENTION

An object of the present invention is to provide a method and apparatus for automatically sorting and selecting components, and particularly, to a method and apparatus which increase device yields while at the same time increasing the utilization efficiency of the component parts used in the manufacture of a device such as an optical amplifier.

According to the invention, a computer-implemented method is provided for automatically selecting component parts for assembly of a device from among a supply of available component parts, each component part having a performance parameter associated therewith, the method including storing in a database memory component part data for each component part of the supply of available component parts, the component part data being in a computer readable format and indicative of a type of each part and the performance parameter of each part; retrieving from said database memory the component part data for a plurality of the available component parts; sorting the component part data retrieved from the database memory according to at least the performance parameter of each retrieved component part data; selecting at least one component part among the sorted component part data based on a preset parameter; and identifying at least one remaining component part among the sorted component part data based on the performance parameter of the at least one component part and the performance parameter of the at least one remaining component part, the at least one component part and the at least one remaining component part being selected for assembly of the device; wherein said retrieving, said sorting, said selecting and said identifying are automatically carried out by a programmed computer responsive to an input instruction of a user.

Also according to the invention, an apparatus is provided for automatically selecting component parts for assembly of a device from among a supply of available component parts, each component part having a performance parameter associated therewith, the apparatus including a database memory having storing therein component part data for each component part of the supply of available component parts, the component part data being in a computer readable format and indicative of a type of each part and the performance parameter of each part; and a programmed computer, responsive to an input instruction from a user and operatively coupled to said database memory, for retrieving from said database memory the component part data for a plurality of the available component parts, sorting the component part data retrieved from the database memory according to at least the performance parameter of each retrieved component part data, selecting at least one component part among the sorted component part data based on a preset parameter, and identifying at least one remaining component part among the sorted component part data based on the performance parameter of the at least one component part and the performance parameter of the at least one remaining component part, the at least one component part and the at least one remaining component part being selected for assembly of the device.

In one aspect of the invention, the identification of the at least one remaining component part includes comparing a specified overall performance parameter of the device to be assembled and the performance parameter of the at least one component part to determine a difference therebetween, and selecting the at least one remaining component part according to said difference.

In another aspect of the invention, the identification of the at least one remaining component part further includes selecting the at least one remaining component part according to a distribution of the performance parameters of the plurality of the available component parts.

In yet another aspect of the invention, the component part data is further indicative of a batch number of each component part in the supply of available component parts, and the retrieving from said database memory includes retrieving the component part data of a first batch number of each type of component part of the device to be assembled, determining whether a sufficient number of each type of component parts associated with each first batch number, and retrieving the component part data of at least one additional second batch number in the event that there is an insufficient number of component parts associated with each first batch number.

In still another aspect of the invention, the programmed computer generates a listing of the at least one component part and the at least one remaining component part selected for assembly of the device, and updates the database memory to reflect removal of the at least one component part and the at least one remaining component part from the supply of available component parts.

In another aspect of the invention, the device to be assembled includes multiple assembly stages each having a plurality of component parts, and the programmed computer repeats the selecting of at least one component part among the sorted plurality of the available component parts and the identifying of at least one remaining component part among the sorted plurality of the available component parts for each assembly stage of the device.

In yet another aspect of the invention, the components parts are passive optical components, and wherein the performance parameter is insertion loss.

In yet still another aspect of the invention the device to be assembled is an optical amplifier, and the component parts include taps, isolators and wave division multiplexers.

Optical subsystems such as amplifiers are made up of discrete components. One of the important parameters that determine the system performance is the insertion loss of the various components. For example, the key parameter determining the noise figure in an optical amplifier is the insertion loss at the input stage of the amplifier. Also, the variation in the output power is mainly determined by the total insertion of the output stage.

The input stage of an amplifier typically contains three different components, i.e., a power monitor tap, an isolator and a WDM to combine the pump and the signal. The insertion loss of the components preceding the erbium fiber contribute to the noise figure term in excess of the noise figure of the erbium doped amplifier itself. Similarly, the output stage of the amplifier has three different components, i.e., a WDM, an isolator and a power monitor. The total output power of the amplifier is the output power of the amplifier minus the total insertion loss of the components. Any variation in the total insertion loss of the components in the input stage and the output stage translates into variation in the noise figure and the output power of the amplifier. The design specifications of the amplifier call for a maximum output power and a minimum output power. This puts a limit on the total insertion loss budget at the input and the output stage of the amplifier.

This means that one can either (a) place a limit on the maximum insertion loss on each of the components, such that the total insertion loss never exceeds the loss budget, or (b) use some kind of simplistic statistical method to limit the cases where the total component loss exceeds the loss budget to a statistically acceptable level. In the first case (a) the tolerances on the individual component losses are stricter which usually means not using any component beyond a certain loss. The total mean insertion loss in such a scenario is always much lower than the acceptable loss, but the component utilization efficiency is significantly lowered. In the second case (b), the limits are placed on the mean loss and the standard deviation of each of the components, so that only a small tail of the resulting distribution exceed the total loss budget. This again limits the number of components that can be used and the resulting yield is less than 100%.

The present invention is directed to a component sorting technique that sorts and groups the components in such a manner that the mean loss of the components is the sum of the mean loss of the individual losses of the components and the standard deviation is close to zero. A feature of the component sorting technique resides in the mean component loss being less than or equal to the acceptable loss budget and the individual components having some random distribution. The invention, although not so limited, is believed to work most effectively for batch sizes of 50 or more.

A statistical comparison between the present technique and the cases (a) and (b) mentioned above will now be described with reference to FIGS. 8(a)–(c) and 9(a)–(c). Consider an optical subsystem with n different components. The components are characterized by mean insertion loss $\mu_i$ and standard deviation $\sigma_i$, for i=1, 2, . . . , n. The performance of the subsystem is characterized by the total loss of all the components in the subsystem. If the components are randomly chosen to build the subsystem, the mean loss of the subsystem will be $\mu=\mu_1+\mu_2+ \ldots +\mu_3$ and the variance $\sigma_1$ is much greater than $\sigma_1$. If the individual components have gaussian distributions, then the resulting variance is $\sigma^2=\sigma_1^2+\sigma_2^2+ \ldots +\sigma_n^2$. Even if some kind of sorting is employed, the resulting variance is high. In contrast, the component sorting technique of the invention employs an iterative method to minimize the variance of the total loss of the components. The iterative method matches the component loss and minimizes the variation in the insertion loss.

Turning to FIGS. 8 (a)–(c), the loss distributions are shown if each of the components making up the front stage of the optical amplifier. FIG. 8(a) shows the loss distribution of 51 monitor taps, FIG. 8(c) shows the loss distribution of 51 isolators, and FIG. 8(c) shows the loss distribution of 51 980 WDMs.

FIGS. 9(a)–(c) show the distribution of total component losses assuming different component selection scenarios applied to the components of FIGS. 8(a)–8(c). FIG. 9(a) depicts the distribution of the total component losses if the components are chosen randomly. The variance of the total component loss is large, and in the case where the maximum acceptable loss is 0.98 dB, a large number of assembled components must be rejected.

FIG. 9(b) shows the distribution of the component losses if some kind of presorting is employed. In this case, two of the three components are sorted in ascending order and the third is sorted in descending order, and then the sorted components are combined. This yields a better result than the random selection of components, but there is still a large variance in total component loss, and a large number of components exceed the 0.98 dB limit.

FIG. 9(c) depicts the distribution of the total component loss using the sorting technique of the preferred embodiment of the present invention. As described herein, the technique functions iteratively and the objective is to minimize the variance of the total component loss. As shown, the resulting distribution is close to a delta function, and all components fall within the 0.98 dB maximum.

DESCRIPTION OF THE DRAWINGS

The above and other objects and advantages of the present invention will become readily apparent from the description that follows with reference to the accompanying drawings, in which:

FIGS. 6(a) through 6(k) are an operational flowchart of yet another embodiment of the present invention;

FIGS. 8(a)–(c) show the loss distributions if each of the components making up the front stage of the optical amplifier; and FIGS. 9(a)–9(c) show the distribution of total component losses assuming different component selection scenarios applied to the components of FIGS. 8(a)–8(c).

DETAILED DESCRIPTION OF THE PREFERRED EMBODIMENTS

In the description that follows, insertion loss is the exemplary performance parameter by which components are sorted and ultimately selected for assembly. It is noted, however, that the invention is not limited to sorting by insertion loss, and instead, other performance parameters may be alternatively applied.

Figure 3:
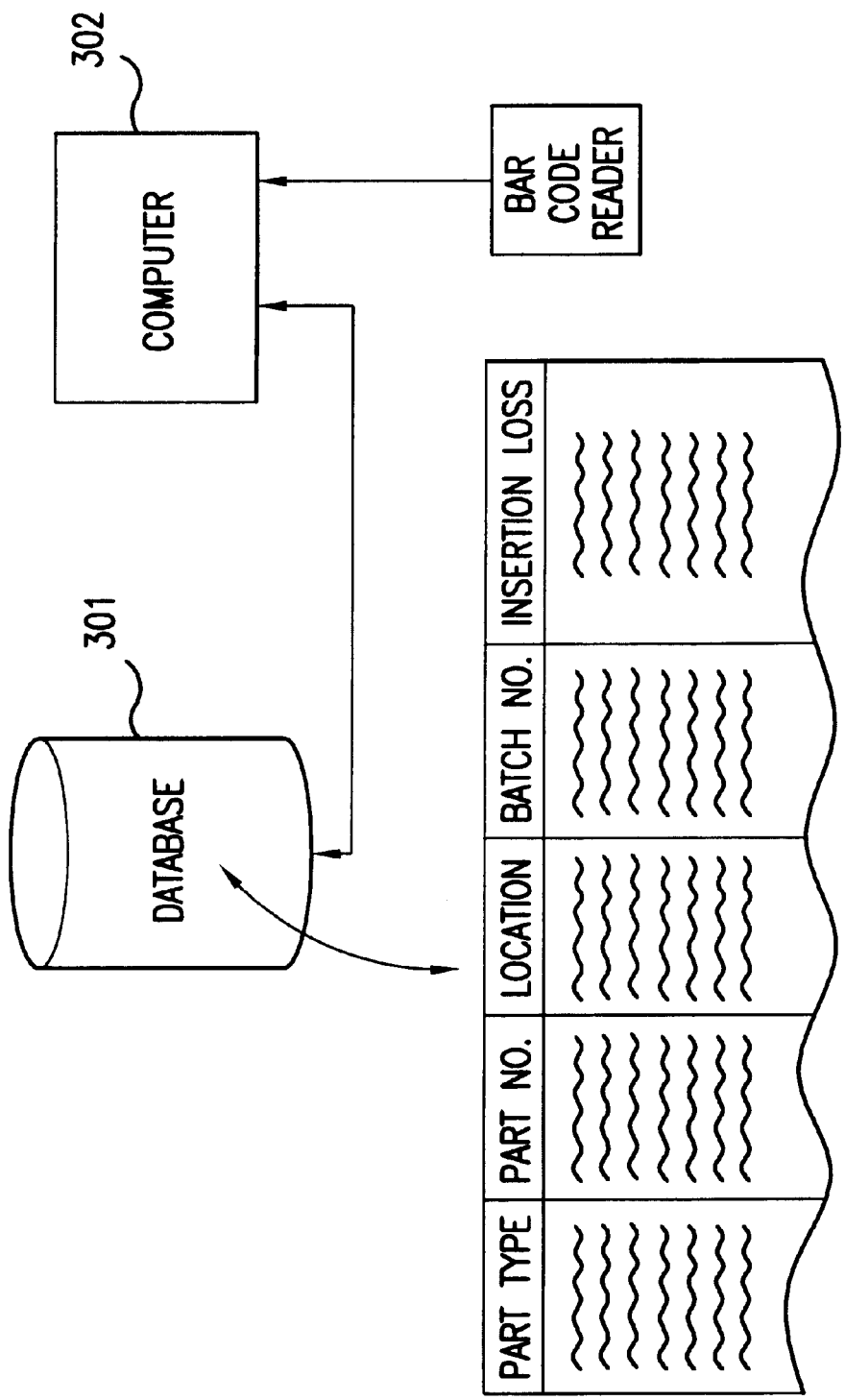
FIG. 3 is a simplified block diagram of a database and computer of the present invention.

FIG. 3 is a block diagram of the basic components of the present invention. A database 301 includes data indicative of each component part in inventory. In particular, the batch number, part number, part type, and insertion loss of each part are stored in database format. The database is under control of a computer 302 which is programmed to automatically sort and select the component parts of the database 301 to generate a list of parts to be used in the assembly of a device. (In the examples which follow, the device is an optical amplifier.) In a preferred embodiment, a bar code reader 303 is also provided to register the insertion and extraction of parts from the inventory. Further, a printer 304 may additionally be provided to generate, for example, a list of selected and to-be-assembled components for extraction from the inventory. In a preferred embodiment, the printer 304 is also used for labeling of parts with an internal "Find Number" (explained later in more detail).

Figure 4:
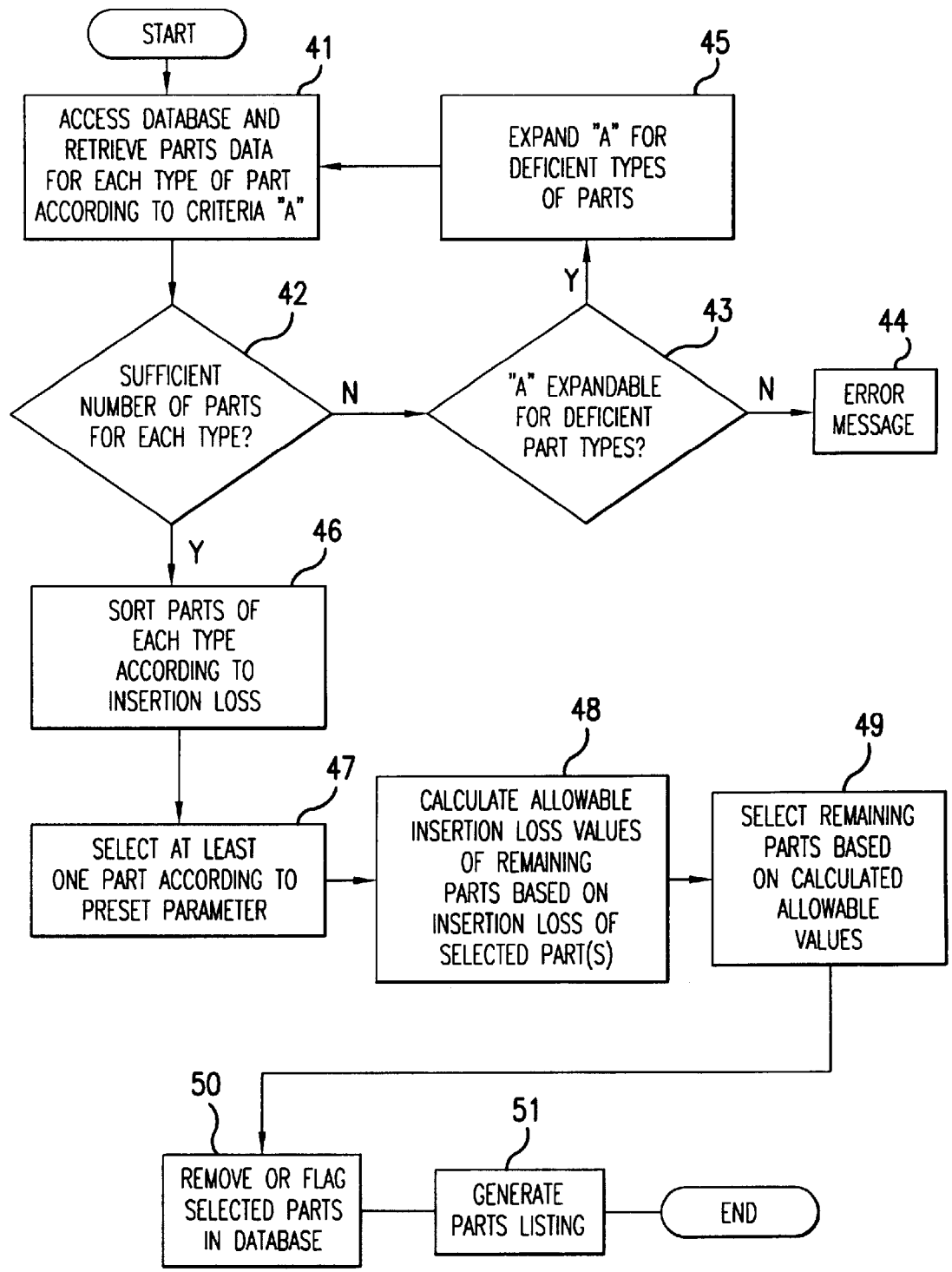
FIG. 4 is an operational flowchart of one embodiment of the present invention.

FIG. 4 is a flowchart showing the operation of the computer 302 in one embodiment of the invention.

At an initial step 41, the computer 302 accesses the database 301 to retrieve parts data for each type of part. The retrieved data is data for each part which falls within the scope of a predefined criteria "A". The criteria "A" might define an age of the parts, or a batch number or numbers of parts. Thus, for example, parts of a given age range or batch number are extracted from the database for consideration.

Next, at step 42, the number of extracted parts for each type is analyzed to determine whether sufficient parts are available for consideration. Typically, it will be advantageous to have a number of parts well in excess of the minimum number of parts needed for assembly. For example, if an optical amplifier is to be assembled having three isolators, the minimum set number of isolators available for consideration might be on the order of twenty or more. This will ensure a sufficient distribution of insertion losses across the available isolators, which will in turn increase the likelihood of identifying a suitable combination of parts (among those available for consideration) for assembly into an acceptable amplifier.

If the number of available parts for any part type is found deficient in Step 42, then the computer 302 determines if the criteria "A" is expandable. For example, a determination is made as to whether the inventory contains additional batches of the deficient parts. If "A" is not expandable, an error message is generated at Step 44. Otherwise, the criteria "A" is expanded at Step 45 and the process returns to Step 41, thereby increasing the pool of available parts for consideration. The check at Step 42 is again conducted, and if necessary, Steps 43 and 45 are repeated until a sufficient number of parts are available for consideration.

Once the necessary number of parts are extracted from the database 302, the parts of each part type are sorted according to one or more performance variable values at Step 46. For example, the parts of each part type may be sorted first by descending insertion loss values (highest-to-lowest) and second by ascending age (oldest-to-newest).

After sorting the available parts under consideration, at least one part of at least one part type is selected according to a preset parameter at Step 47. For example, again in the case of an optical amplifier, the oldest isolator having an insertion loss value closest to a specified insertion loss may be selected, or the oldest isolator having the lowest insertion loss may be selected. In this manner, an initial part or an initial set of parts is selected.

Having identified the initial part or parts in Step 47, the computer 301 proceeds in Step 48 to calculate an allowable performance variable value of each of the remaining types of parts which make up the device to be assembled. In the example of the device being an optical amplifier and the performance variable being insertion loss, this would entail comparing the insertion loss or losses of the part or parts identified in Step 47 with the insertion loss budget of the optical amplifier. Determining the allowable performance variable values in Step 48 allows for the computer 301 to then select at Step 49 the remaining parts of the to-be-assembled device from the sorted list of available parts.

Once again using the example of an optical amplifier, the oldest WDM having an insertion value which is closest to but not exceeding a calculated allowable insertion loss value may be selected. Each of the remaining parts needed for assembly is thus selected in this manner.

After all the parts of the to-be-assembled device have been selected from the sorted available parts list in Steps 47–49, the thus selected parts are flagged or removed from the parts database 302 in Step 50. Then, at Step 51, a listing of the selected parts is generated to terminate the process. The listing may be in printed or displayed form for manual extraction of the listed parts from the inventory by a user, or in electronic form for automated extraction of the listed parts from the inventory.

According to the invention as described above in connection with FIG. 4, the parts are automatically selected based on relative performance variable values, and many of the problems associated with random or age-based parts selection from the component inventory are thereby overcome. Since the allowable performance variable values are calculated and used as the basis for the selection of parts, the tendency to assemble economically expensive "over-built" devices far-exceeding necessary performance specifications is substantially reduced. Similarly, the utilization efficiency of the inventory is enhanced. Also, automated consideration of performance variable values substantially increases the likelihood that the resultant device will meet performance specifications, i.e., the device yields are improved.

Figure 5A:
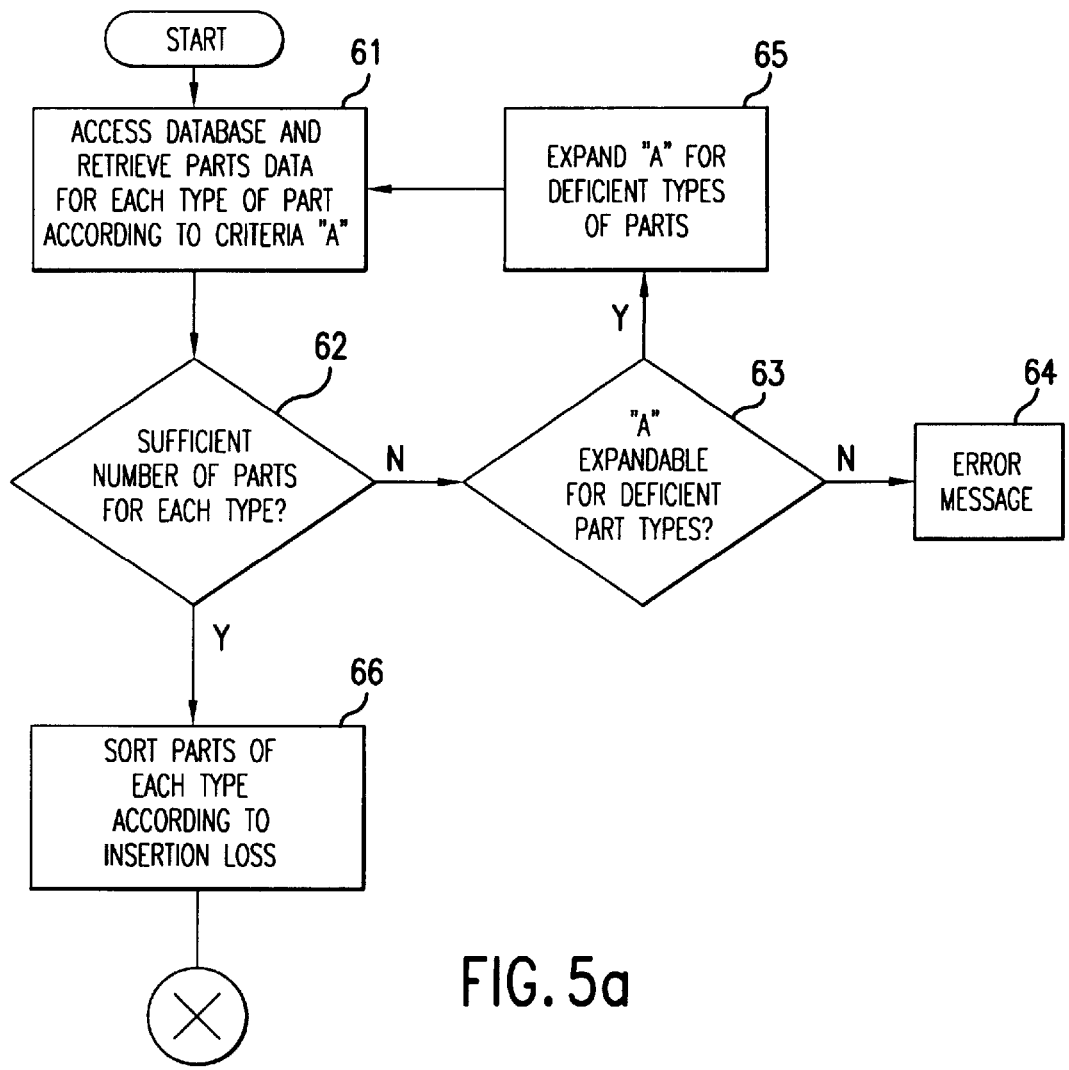
FIGS. 5(a) and 5(b) are an operational flowchart of another embodiment of the present invention.
Figure 5B:
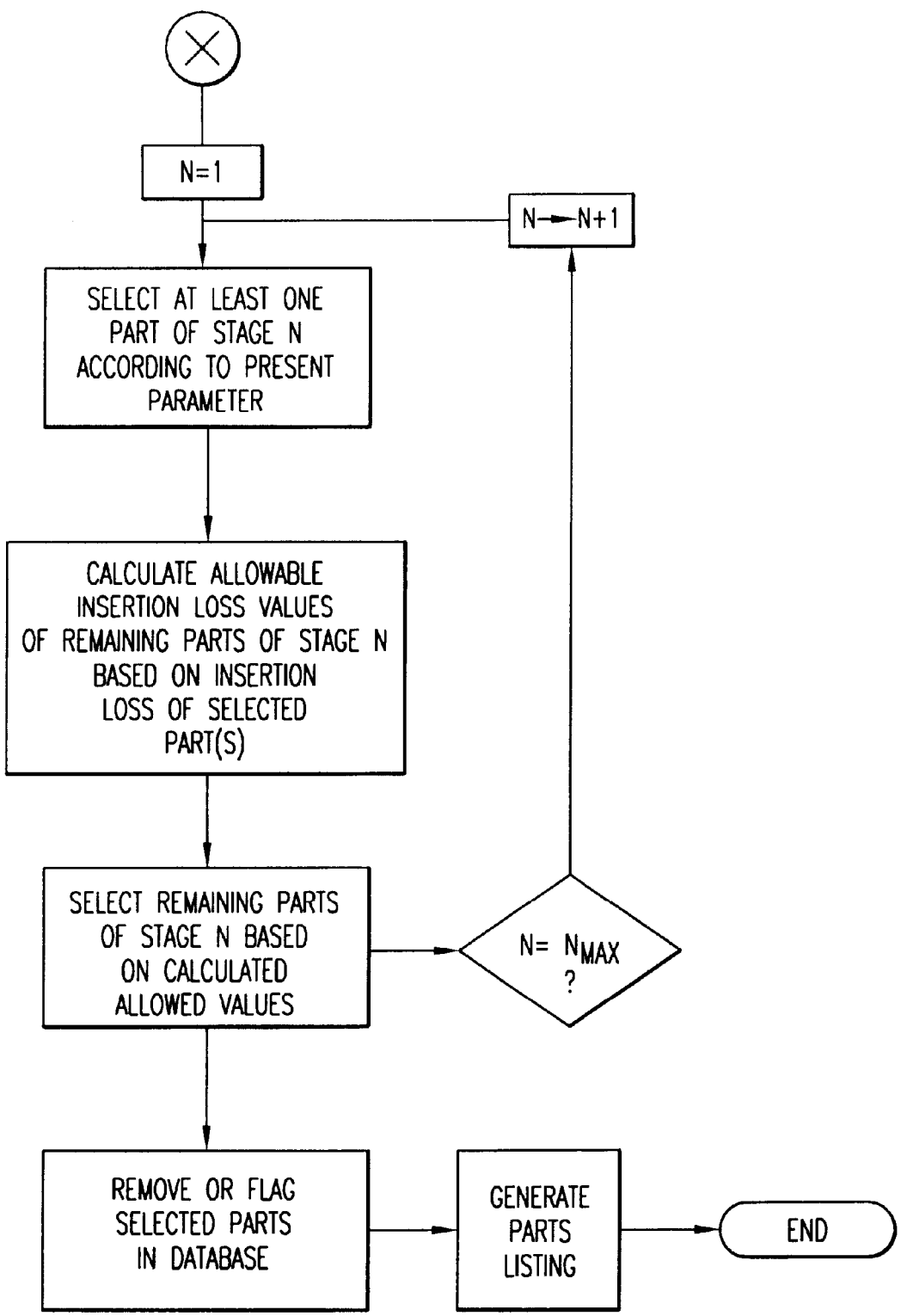
Figure 6A:
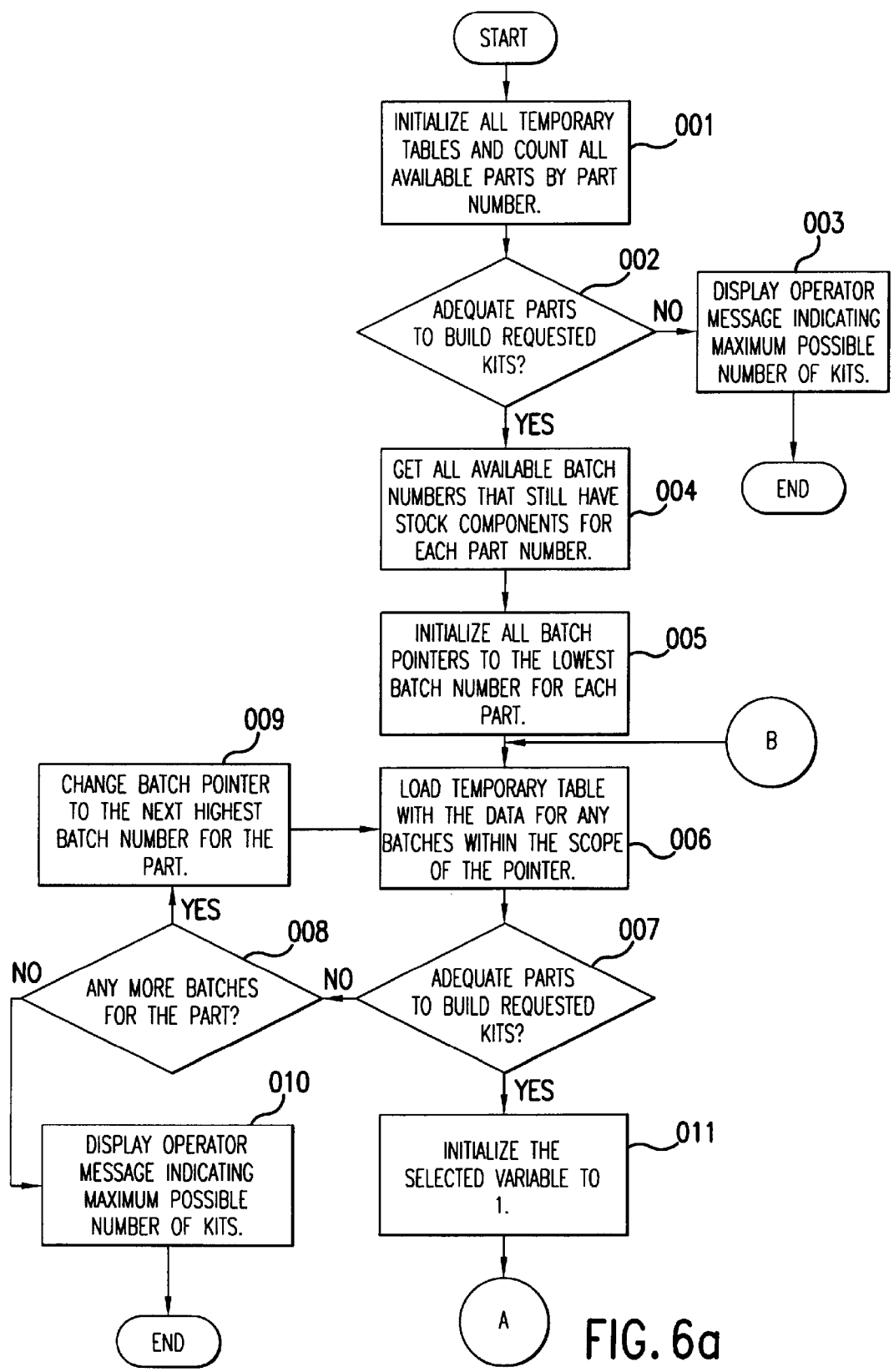
Figure 6C:
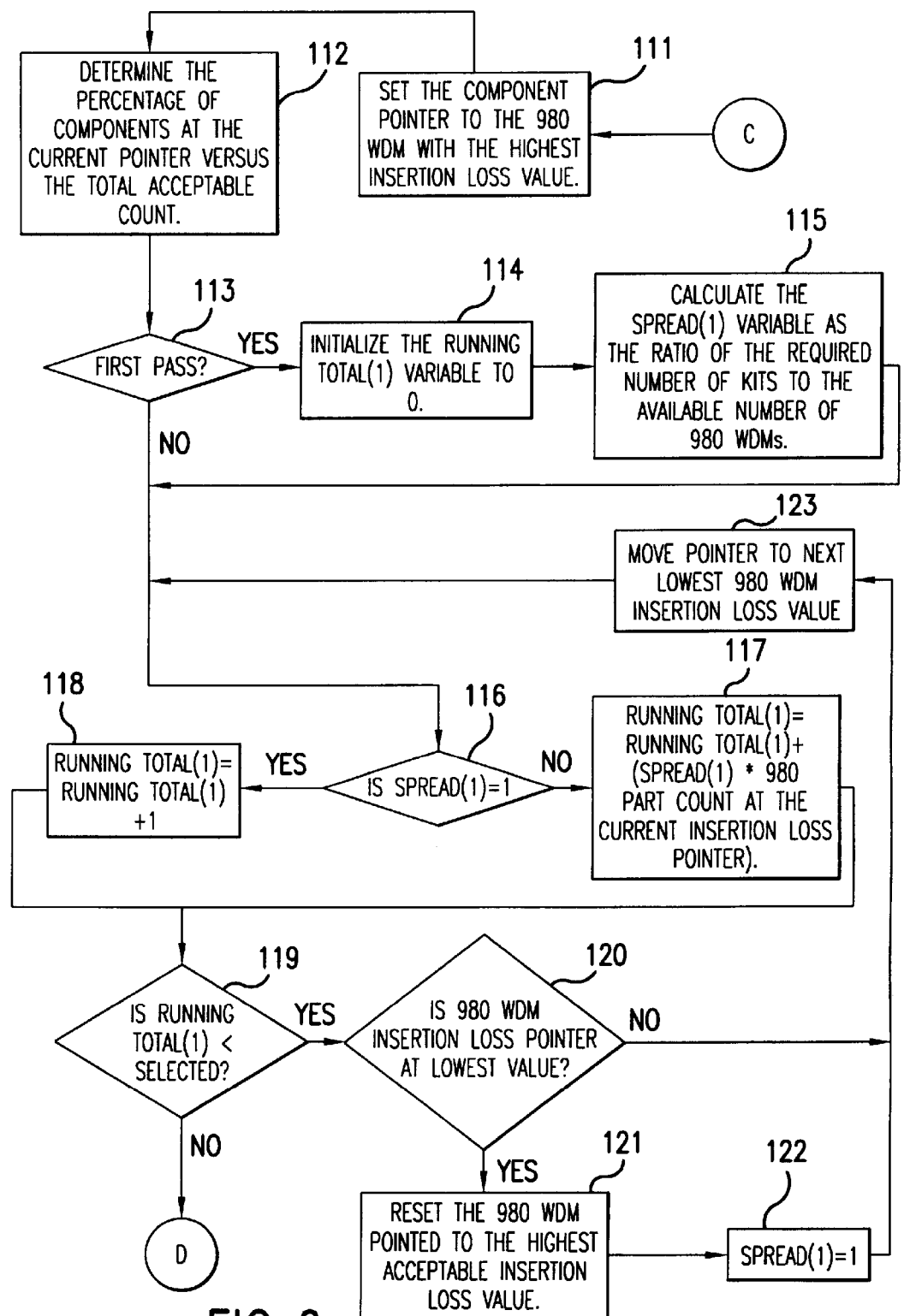
Figure 6D:
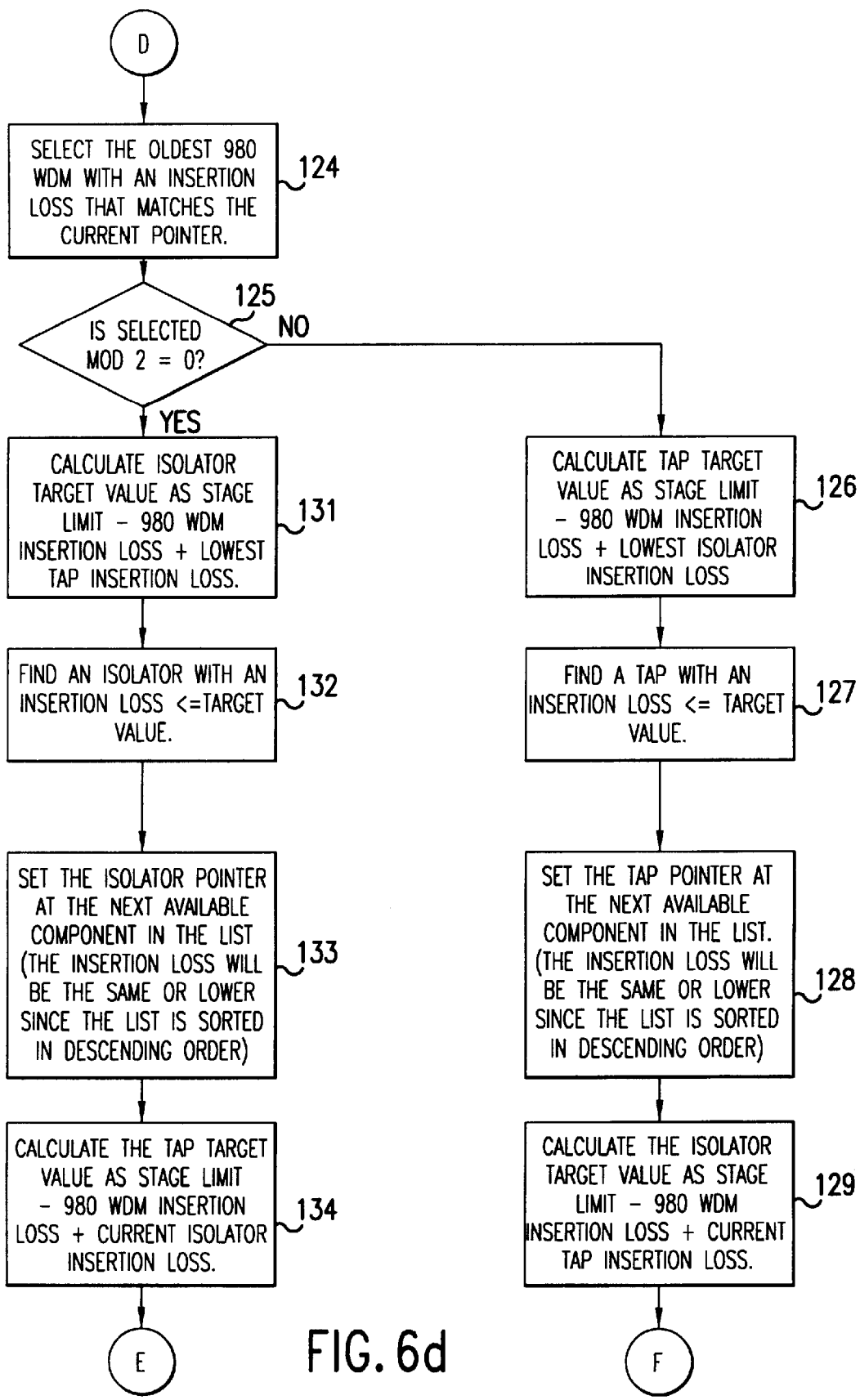
Figure 6E:
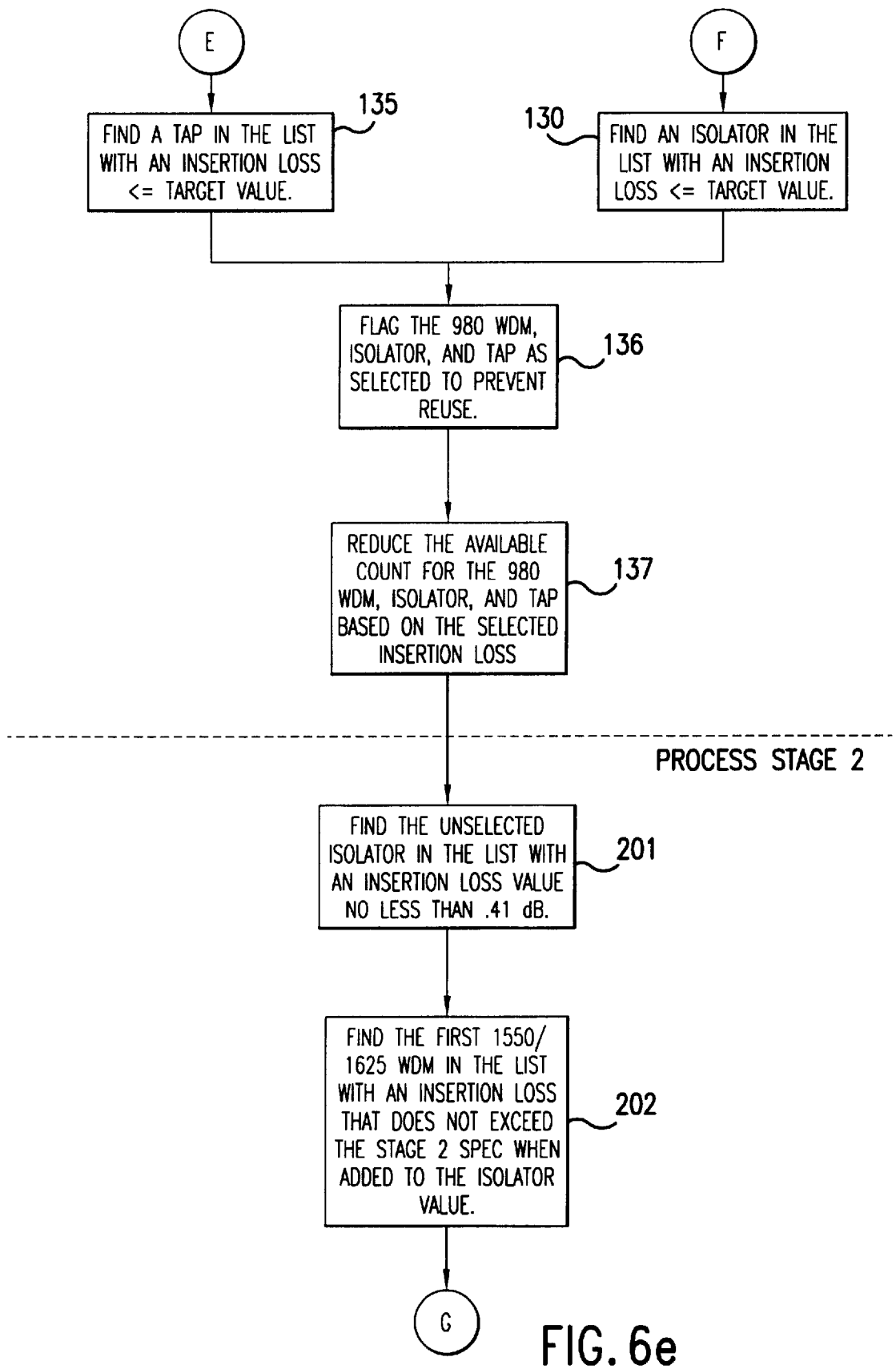
Figure 6F:
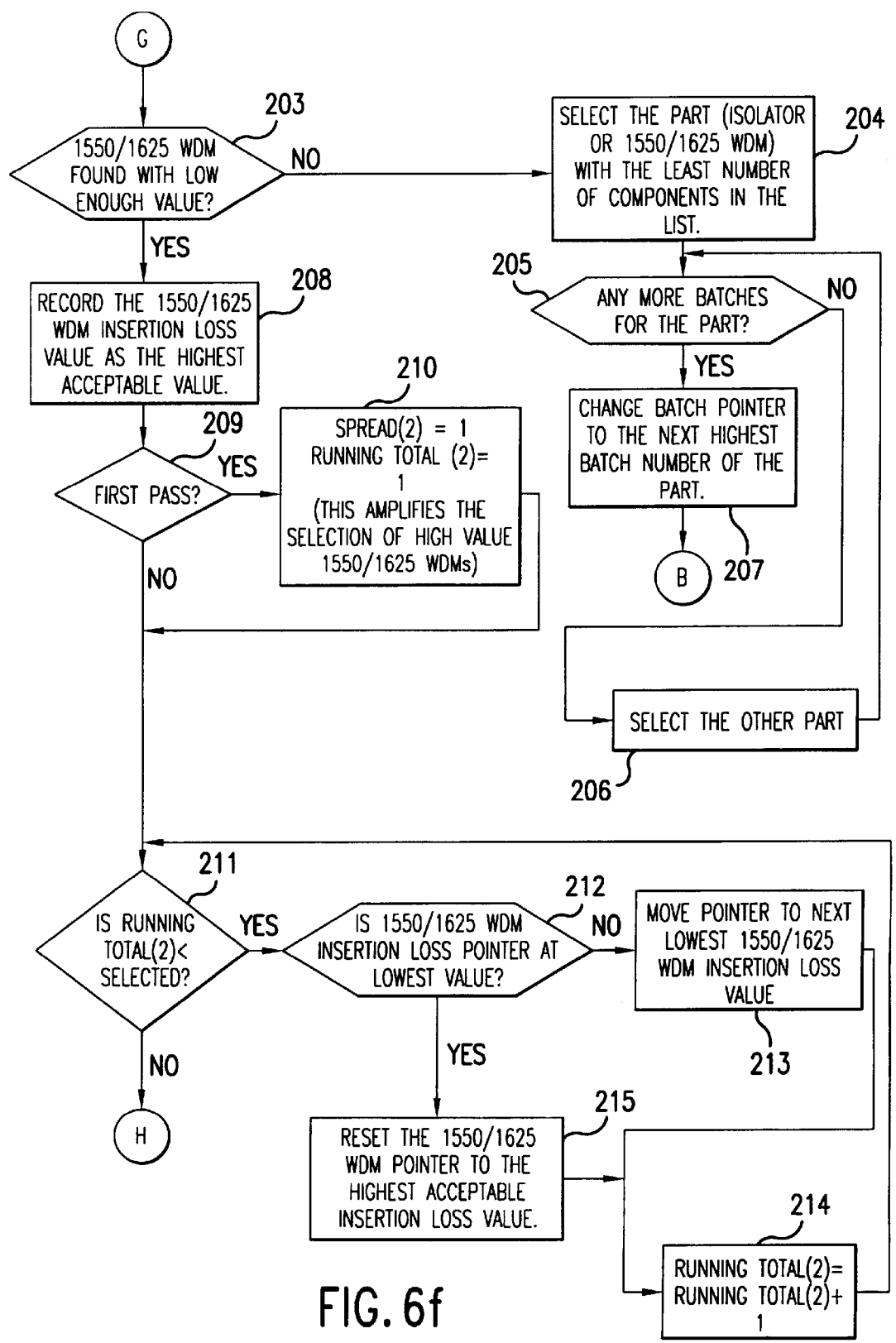
Figure 6G:
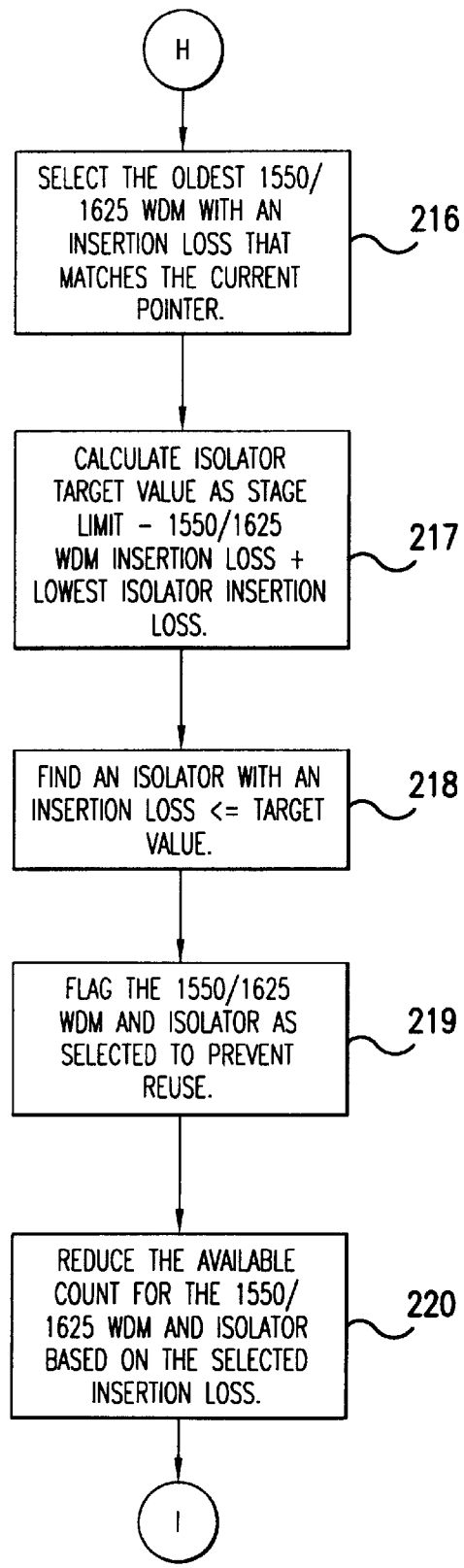
Figure 6H:
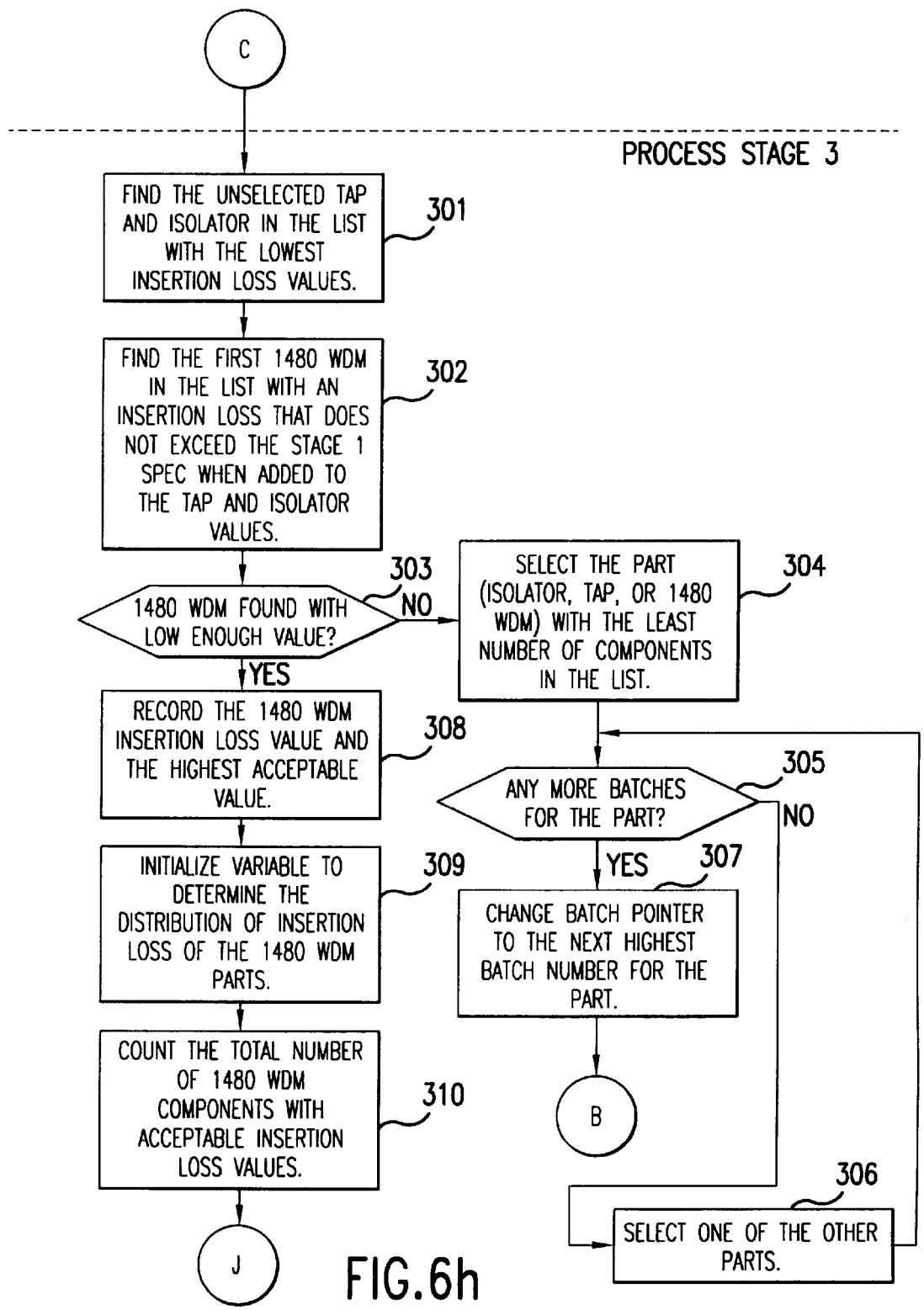
Figure 6I:
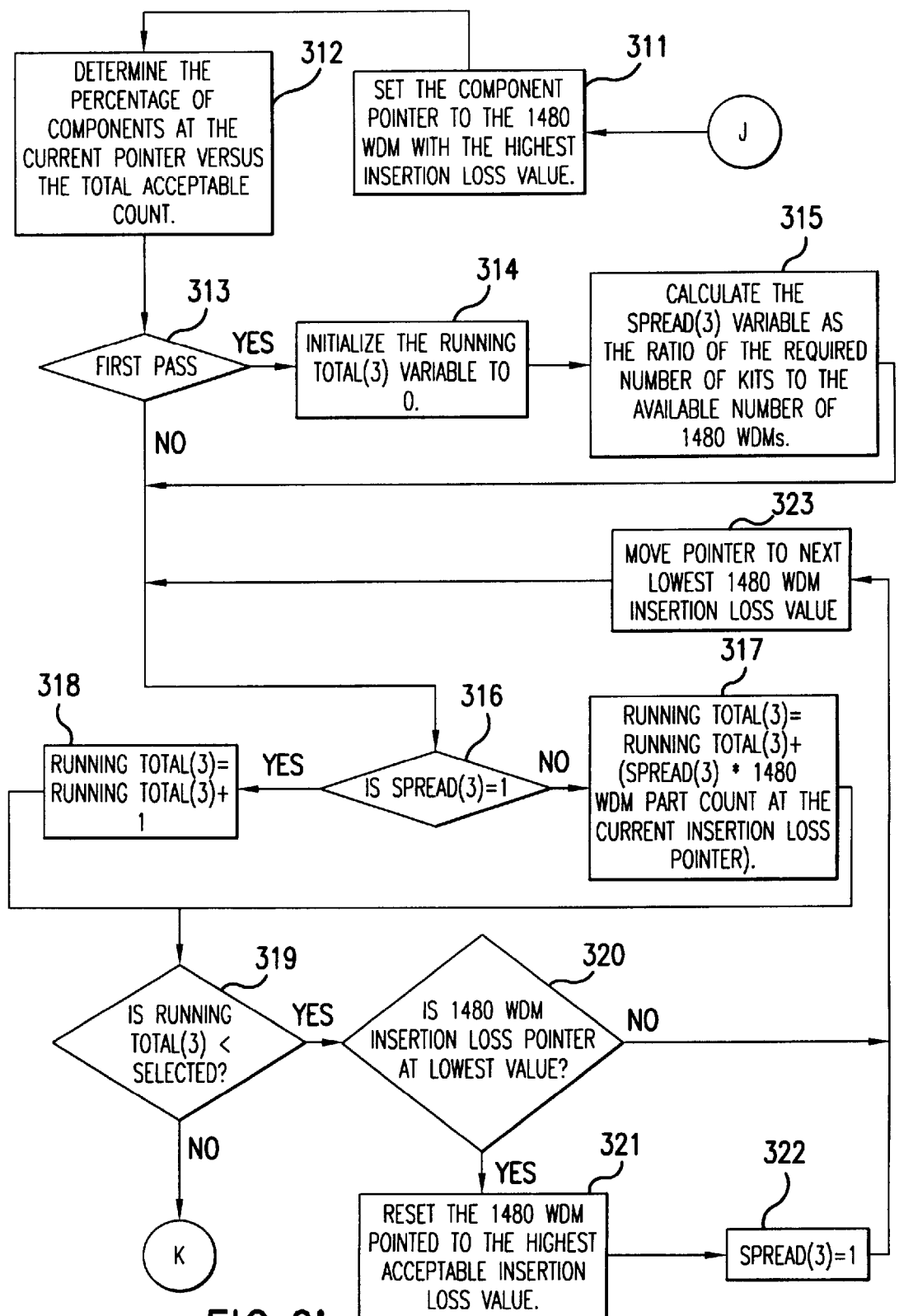
Figure 6J:
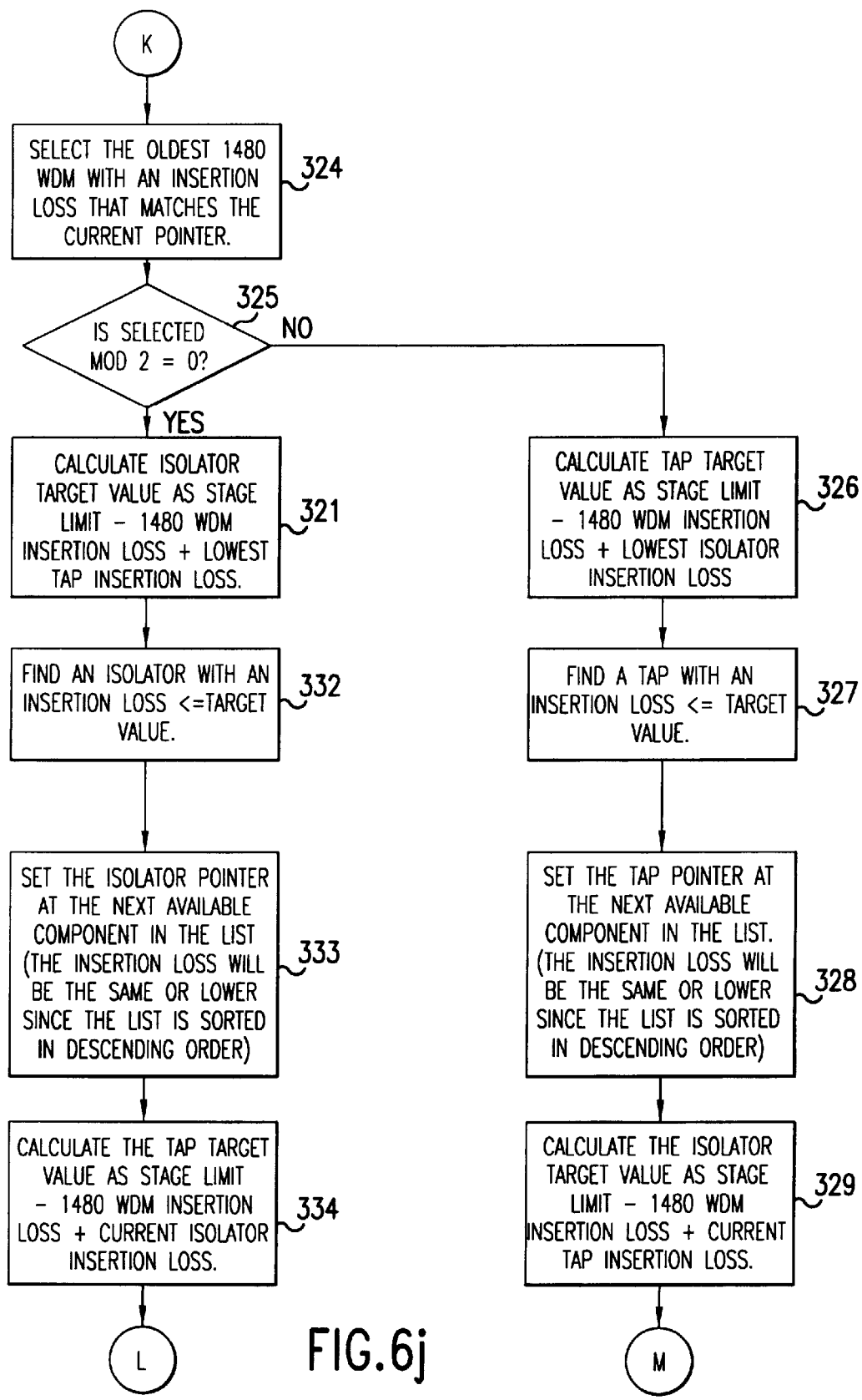
Figure 6K:
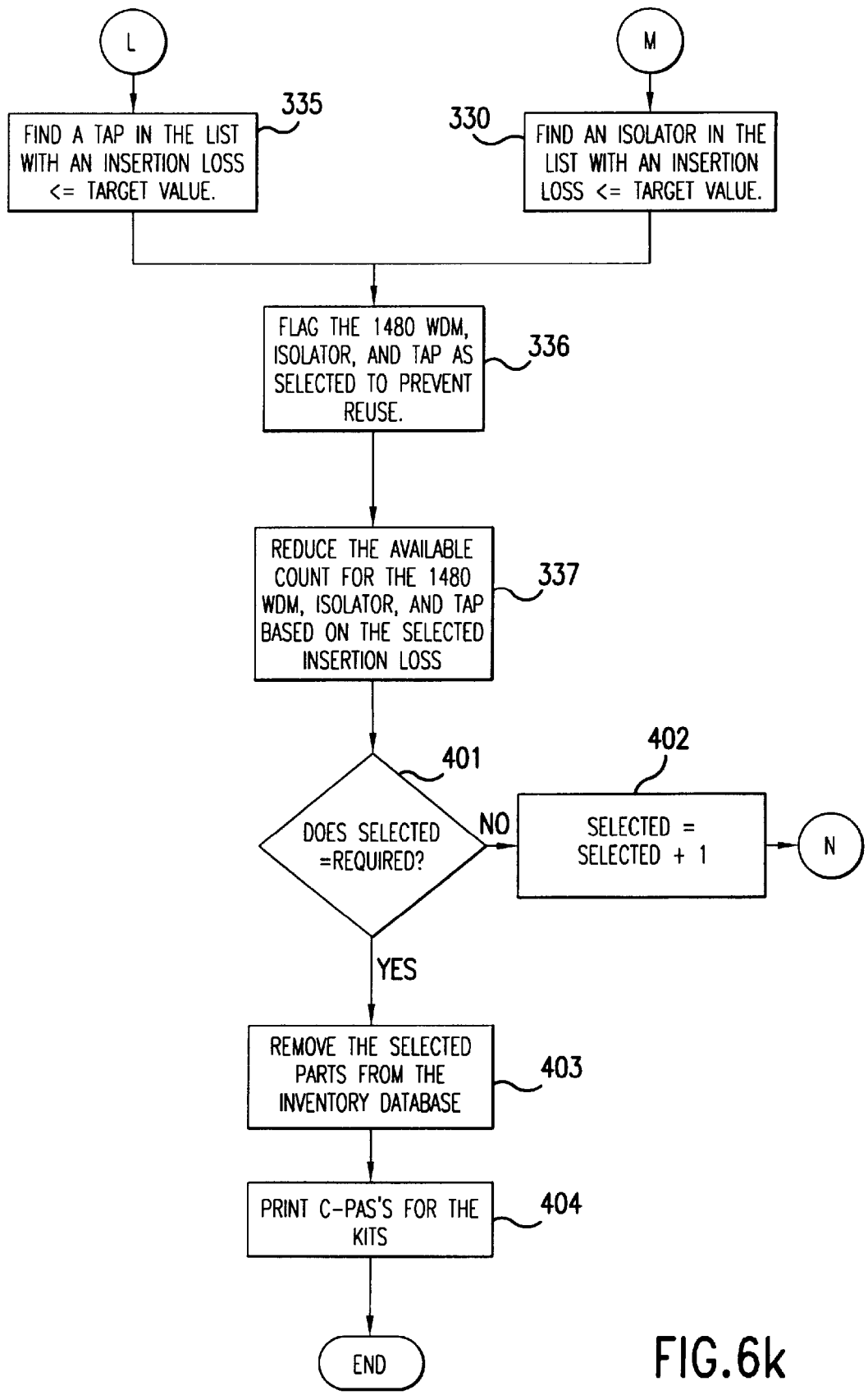

FIGS. 5(a) and 5(b) illustrate the operation of the computer 302 in another embodiment of the invention. In the embodiment, the device to be manufactured is divided into N stages (N being an integer of 2 or more), each stage having two or more components. As described in more detail below, the components of the device are selected on a stage-by-stage basis.

Steps 61–66 of FIG. 5(a) are respectively the same as Steps 41–46 of FIG. 5(a), and thus, a description thereof will not be repeated here. The result of these steps is a listing of available parts under consideration, sorted by at least one performance variable value.

Turning to FIG. 5(b), the stage number N is set to 1 at Step 67. Then, steps 68–70 are carried out with respect to Stage 1 in a manner similar to that of respective Steps 47–49 of FIG. 4. That is, at least one part of at least one part type of Stage 1 of the device to be assembled is selected according to a preset parameter at Step 68. For example, once again in the case of an optical amplifier, the oldest isolator having an insertion loss value closest to a specified insertion loss may be selected, or the oldest isolator having the lowest insertion loss may be selected. In this manner, an initial part or an initial set of parts is selected.

Having identified the initial part or parts in Step 68, the computer 301 proceeds in Step 69 to calculate an allowable performance variable value of each of the remaining types of parts which make up the first stage of the device to be assembled. In the example of the device being an optical amplifier and the performance variable being insertion loss, this would entail comparing the insertion loss or losses of the part or parts identified in Step 68 with the insertion loss budget of Stage 1 of the optical amplifier. Determining the allowable performance variable values in Step 69 allows for the computer 301 to then select at Step 70 the remaining parts of the first stage of to-be-assembled device from the sorted list of available parts. Again in the case of an optical amplifier, the oldest WDM having an insertion value which is closest to but not exceeding a calculated allowable insertion loss value may be selected. Each of the remaining parts needed for assembly of Stage 1 are thus selected in this manner.

At Step 72, a determination is made as to whether the just completed stage N is the final stage $N_{MAX}$ of the to-be-assembled device. If not, N is incremented by 1 and Steps 68–70 are repeated to obtain a selection of parts for the next stage of the assembly. If $N=N_{MAX}$, then the selected parts for all the stages are flagged or removed from the database 301, and a parts listing is generated, in a manner similar to Steps 50 and 51 of FIG. 4.

Figure 1:
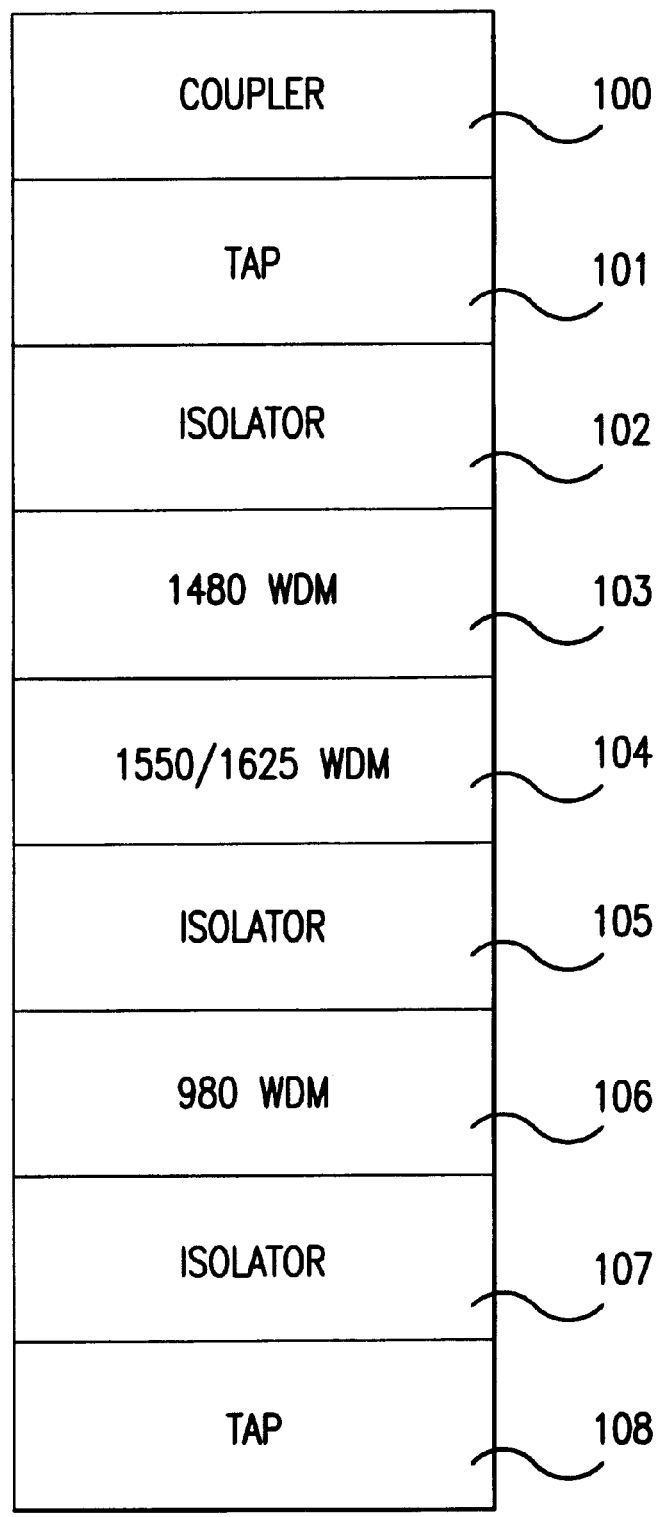
FIG. 1 is a block diagram showing the passive optical components of an optical amplifier cassette.
Figure 2:
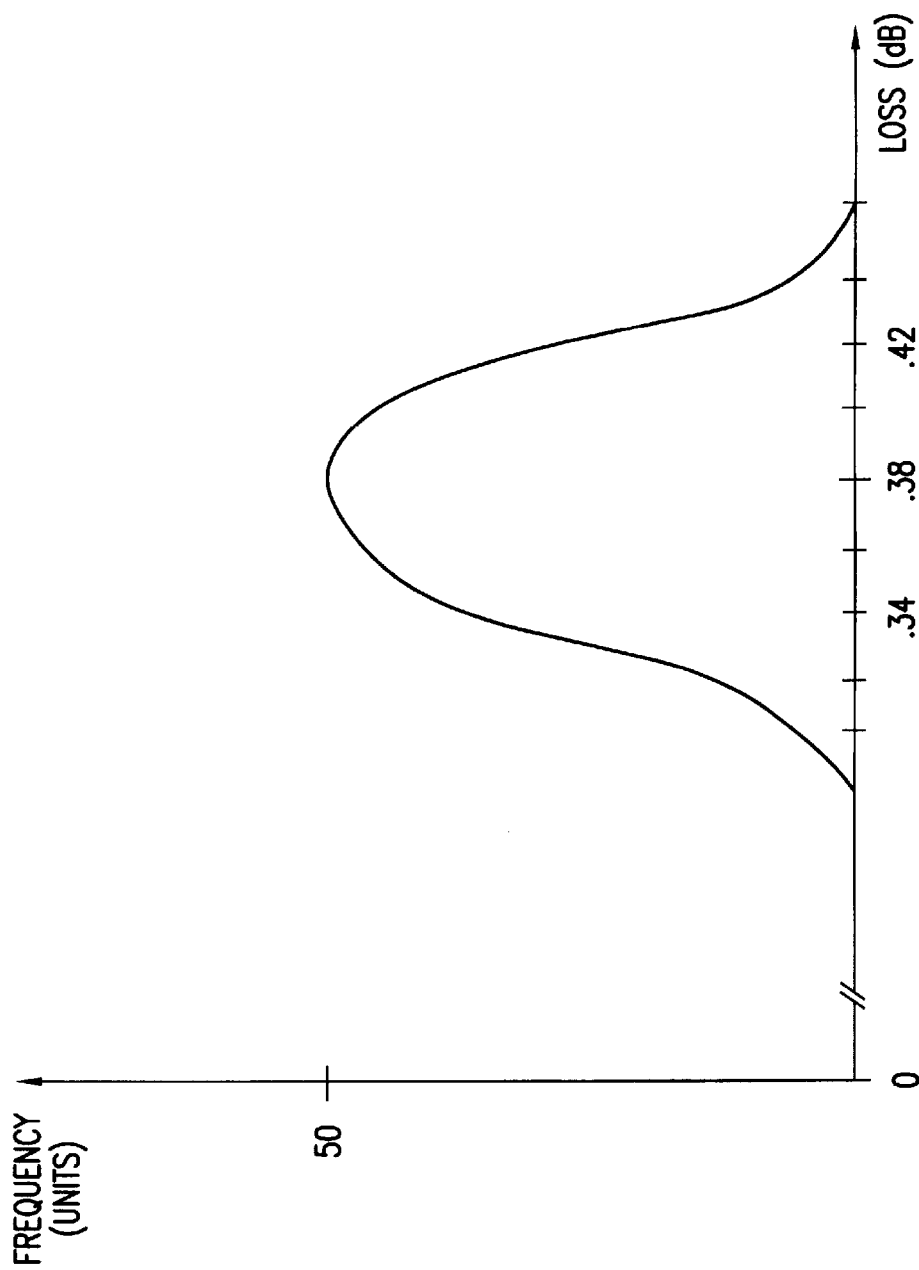
FIG. 2 illustrates a typical insertion loss distribution of a batch of isolators.

To further enhance understanding of the present invention, an exemplary embodiment of the invention will now be described below with reference to the more comprehensive flowchart constituted by FIGS. 6(a) through 6(k). These figures collectively illustrate the operation of the computer 302 (FIG. 3) as it automatically searches the database 302 (FIG. 3) for components parts which may be used to assemble an optical amplifier such as that shown in FIG. 1. In this embodiment, the amplifier is divided into three stages. Referring still to FIG. 1, Stage 1 includes the 980 WDM 106, the isolator 107 and the tap 108; Stage 2 includes the 1550/1625 WDM 104 and the isolator 105; and Stage 3 includes the tap 101, the isolator 102 and the 1480 WDM 103.

Also, in this embodiment, the part number (assigned by the parts supplier) is initially translated into a Find Number indicative of both the type of the part and a storage location of the part in the component inventory. The processing is started by the placement of an order for parts of a selected number of kits, each "kit" constituting an optical amplifier.

Steps 001–012 constitute a preprocessing routine in which the data is initialized and a temporary table is loaded.

At step 001, temporary database tables are initialized and the available parts by part number are counted. Step 002 is an initial screening in which it is first determined that sufficient parts are in inventory to build the requested number of amplifiers. If not, at step 003, an operator message is displayed indicative of the maximum number of amplifier kits which can be assembled from the existing inventory. Assuming the inventory has the adequate number of parts, all batch numbers are retrieved that still have components for each part number at step 004. In other words, any batch in which all components have not been exhausted is retrieved. At step 005, a batch pointer is then initialized to the lowest (i.e., the oldest) retrieved batch number for each part.

Step 106 entails loading the component data for the batch of each batch pointer into the temporary table. As mentioned above, this data includes the part number (or "Find Number") of each part within the batch and the insertion loss of each part with the batch. At step 007, a determination is made as to whether there are sufficient qualified parts within the batches of the batch pointer to build the requested number of amplifier kits. If not, a query is made at step 008 to determine if there any more batches for the part or parts for which there is a deficiency. If the result of the query at step 008 is negative, an operator message is displayed indicating the maximum number of amplifier kits that can be constructed from the existing inventory. Otherwise, in the event that further batches do exist, the batch pointer for the part or parts in which there is a deficiency is changed to the next highest (i.e., the next oldest) batch number. Step 006 is then repeated, except that scope of one or more of the batch pointers has been expanded to include a next oldest batch. In other words, the two oldest batches are combined. Thus, additional parts are included in the temporary table prior to again conducting the check of step 007.

When the temporary table is deemed to contain the adequate number of parts to construct the requested number of amplifier kits, a SELECTED variable is initialized to 1 at step 011. Then, at step 012, the data of the temporary table is sorted first by descending insertion loss and second by ascending Find Number.

Thus, upon completion of step 112, the temporary table is formed containing data, for each type of part, indicative of the Find Number and insertion loss of each part within the one or more oldest batches of the existing inventory. Further, such data is sorted by insertion loss and Find Number.

As mentioned above, in a preferred embodiment of the invention, the amplifier is divided into multiple stages for purposes of sorting and selecting components. Steps 101–137 will now be explained. These steps constitute the process for Stage 1, i.e., the process for selecting the tap 108, the isolator 107 and the 980 WDM 106 of FIG. 1.

At step 101, the temporary table is searched for the tap and the isolator having the lowest insertion loss values. In the case where two or more components have the same lowest insertion loss value, the part among them having the lowest Find Number (i.e., the oldest part) is selected. Then, the first 980 WDM is located having an insertion loss value (and the lowest Find Number) which, when summed together with those of the isolator and tap found in step 101, does not exceed the Stage 1 loss budget.

In the event where a 980 WDM having a sufficiently low insertion loss value could not be located in the temporary table, the result of the inquiry at Step 103 is negative and the process proceeds to Step 104. At Step 104, the part (i.e., the isolator, the tap or the 980 WDM) having the least number of parts in the list of the temporary table is identified, and an inquiry is made at Step 105 as to whether there are any more batches for the identified part. If not, another part is selected in its place at Step 106. Then, the batch pointer for the thus identified or selected part is changed to the next highest batch number and the process loops back to Step 006 to reload the temporary table with the parts of an additional batch.

In the case where a 980 WDM is successfully identified in Step 103, the insertion loss value thereof is recorded as the "highest acceptable value" at Step 108. In a next Step 109, variables are initialized for use in determining the distribution of the insertion loss values relative to the required number of amplifier kits during the selection process. This is carried out in Steps 110–123 as described below.

At Step 110, the total number of 980 WDM parts having an insertion loss value which is less than or equal to the highest acceptable value are counted. Then, at Step 111, a component pointer is set to the 980 WDM parts having the highest insertion loss values, and, at Step 112, the percentage of components at the current component pointer versus the total acceptable count is determined. For example, assume the highest acceptable value of Step 108 is 0.42 dB, and that there are eight-five (85) 980 WDM's having insertion loss values of 0.42 dB or less, twenty (20) of which have insertion loss values of exactly 0.42 dB. The percentage of components at the current pointer versus the total acceptable count would then be 20/85 or 23.5%.

In the case where this is a first pass through the process ("Yes" at Step 113), a RUNNING TOTAL (1) variable is initialized to 0 at Step 114. Then, at Step 115, a SPREAD (1) variable is calculated as the ratio of the required number of kits to the total acceptable number of 980 WDM's. Assume once again that there are eighty-five (85) acceptable 980 WDM's. Further assume that the order has been placed for ten (10) amplifier kits. The SPREAD (1) variable would then be 10/85 or about 0.12. After calculating the SPREAD (1) variable in Step 115, or in the case where the result of the inquiry at Step 113 is negative, the process proceeds to Step 116.

At Step 116, an inquiry is made as to whether the SPREAD (1) variable is equal to 1. If not, the RUNNING TOTAL (1) variable is increased at Step 117 by an amount equal to the product of the SPREAD (1) variable and the number of 980 WDM parts at the current component pointer. Continuing with the examples given above in which SPREAD (1) is equal to 0.12 and the number of parts at the component pointer is 20, the new RUNNING TOTAL (1) becomes 0+(0.12×20)=2.4.

At Step 119, the question is asked as to whether the RUNNING TOTAL (1) is less than the SELECTED kit number. In the case of the first pass in which the first kit is processed, the SELECTED variable would be 1, and in the case given above where the RUNNING TOTAL (1) equals 2.4, the answer at Step 119 would be "no". On the other hand, where the result of the inquiry at Step 119 is positive, the process proceeds to Step 120 where an another inquiry is made as to whether the 980 WDM pointer is currently at the lowest insertion loss value. In the examples given above where the pointer is set at 0.42 dB, the answer would be "no", and the process would proceed directly to Step 123 where the component pointer is moved to the parts having the next lowest insertion loss value (e.g. 0.42 dB). On the other hand, in the case where the pointer is at the lowest insertion loss value, the component pointer is reset at Step 121 to the highest acceptable insertion loss value (e.g., 0.42 dB), and the SPREAD (1) variable is set equal to 1 at Step 122. From there, the process proceeds to Step 123.

In the case where the SPREAD (1) variable has been set to 1 in Step 122, the process proceeds from Step 116 to Step 118 where the current RUNNING TOTAL (1) variable is incremented by 1, and then to Step 119 where RUNNING TOTAL (1) is compared with the SELECTED variable as already described. In the case where the SPREAD (1) variable has not been set to 1, Step 117 is repeated with respect to the number of parts at the newly set component pointer of the next lowest 980 WDM insertion loss values of Step 123. In other words, continuing with the examples given above, and assuming there are fifteen (15) 980 WDM's having insertion loss values of 0.42 dB, the new RUNNING TOTAL (1) would be 2.4+(0.12×15) 4.2. Once again, after Step 117, the process proceeds to Step 119.

In the case where the result of the inquiry at Step 119 is negative, i.e., where the RUNNING TOTAL (1) is less than SELECTED, the oldest 980 WDM (i.e., the 980 WDM having the lowest Find Number) of the current pointer is selected at Step 124. This is the selected 980 WDM of the first stage of the SELECTED kit.

It may be useful at this time to examine the effects of the variables SPREAD(1) and RUNNING TOTAL (1) in the process of selecting the 980 WDM. As should be readily apparent, the variable SPREAD (1) calculated in Step 115 decreases as the number of acceptable parts increases and as the number of require kits decreases. Also, the amount by which RUNNING TOTAL (1) is increased in Step 117 becomes greater as the number of parts at the current pointer increases. Thus, in the case where there are only a small number of kits to construct, or in the case where only a small number of parts exist at the current pointer, the process exhibits a tendency to look to the next lowest insertion loss value for selection.

For example, assume once again that there are 10 kits to be assembled, and that there are eight-five (85) 980 WDM's having insertion loss values of 0.42 dB or less. Thus, SPREAD (1) at Step 115 would again be 10/85 or about 0.12. This time, however, also assume that there are only five (5) 980 WDM's having insertion loss values of 0.42 dB, i.e., the current pointer is set to only 5 of the acceptable 980 WDM's. In this case, the RUNNING TOTAL (1) at step 117 would be 0+(0.12×5)=0.6. The result of the inquiry at Step 119 would then be "yes", in which case the pointer is moved to the 980 WDM's of the next lowest insertion loss value of 0.41 dB. In this manner, the process searches for an insertion loss value associated with a sufficient number of 980 WDM's to thereby take into account the insertion loss distribution of the acceptable 980 WDM's. However, in the case where the component pointer has been set in turn to each of the possible insertion loss values, the process simply "forces" the selection of a 980 WDM having the next-to-the-highest insertion loss value (Steps 121 and 123).

Continuing now with the process flowchart, after the selection of the Stage 1 980 WDM in Step 124, the Stage 1 isolator and the Stage 1 tap are selected in Steps 126–130 or Steps 131–135 depending on the value of SELECTED MOD2 in Step 125. In other words, when SELECTED MOD2 equals 0, the process proceed to Steps 126–130, and otherwise, the process proceeds to Steps 131–135. In this manner, Steps 126–130 and Steps 131–135 are alternately carried out during each pass.

At Step 126, a target value for the Stage 1 tap is calculated by subtracting the insertion loss value of the selected 980 WDM and the lowest insertion loss of the isolators of the temporary table from the Stage 1 insertion loss budget (the STAGE LIMIT). Then, at Step 127, a tap is located within the temporary table having an insertion loss equal to the tap target value. If no such tap exists, then the next lowest insertion loss value is used in locating a tap.

The process proceeds to Step 128 where the tap pointer is set a the next available component on the list. Since the list is sorted in order of descending insertion losses, the insertion loss of the tap set by the pointer is equal to or less than the insertion loss of the tap found in Step 126.

At this point, the 980 WDM and the tap of Stage 1 have been selected. Next, at Step 129, an isolator target value is calculated by subtracting the insertion losses of the selected 980 WDM and the selected tap from the STAGE LIMIT. Then, an isolator is selected from the temporary table having an insertion loss value which is equal to or less than the target value. The thus found isolator is selected as the isolator for Stage 1 .

As is apparent from the flowchart, alternative Steps 131–135 are respectively the same as just described Steps 126–130, except that in Steps 131–135 the isolator target value is calculated prior to the tap target value. The result of these steps is the selection of an isolator and then a tap for Stage 1 of the assembly.

Once the 980 WDM 106, the isolator 107 and the tap 108 for Stage 1 have been selected, they are flagged in the temporary table at Step 136 to prevent reuse. Then, after reducing the available count for each part based on the selected insertion losses at Step 137, the process for Stage 1 is completed.

As will be seen below, the processes for Stages 2 and 3 closely parallel that of Stage 1, the primary distinction lying in the fact that Stage 2 contains only two component parts.

The process for Stage 2 is illustrated as Steps 201–220, and is for selecting the 1550/1625 WDM 104 and the isolator 105 of the optical amplifier kit shown in FIG. 1.

At step 201, the temporary table is searched for the unselected (not flagged) isolator having a given insertion loss value, e.g., 0.41 dB. Again, in the case where two or more components have the same given insertion loss value, the part among them having the lowest Find Number (i.e., the oldest part) is selected. Then, the first 1550/1625 WDM is located having an insertion loss value (and the lowest Find Number) which, when summed together with that of the isolator found in step 201, does not exceed the Stage 2 loss budget.

In the event where a 1550/1625 WDM having a sufficiently low insertion loss value could not be located in the temporary table, the result of the inquiry at Step 203 is negative and the process proceeds to Step 204. At Step 204, the part (i.e., the isolator or the 1550/1625 WDM) having the least number of parts in the list of the temporary table is identified, and an inquiry is made at Step 205 as to whether there are any more batches for the identified part. If not, another part is selected in its place at Step 206. Then, the batch pointer for the thus identified or selected part is changed to the next highest batch number and the process loops back to Step 006 to clear all flags and reload the temporary table with the parts of an additional batch to start the process anew.

In the case where a 1550/1625 WDM is successfully identified in Step 203, the insertion loss value thereof is recorded as the "highest acceptable value" at Step 208.

In the case where this is a first pass through the process ("Yes" at Step 209), both a SPREAD (2) variable and a RUNNING TOTAL (2) variable are initialized to 1 at Step 210. By initializing these variables to 1 (in contrast to the Stage 1 process), the selection of high value 1550/1635 WDM's is increased. (It is noted that the Stage 2 process is essentially the same as a modified version of the Stage 1 process in which the SPREAD (1) variable is set to 1 at Step 115.)

At Step 211, the question is asked as to whether the RUNNING TOTAL (2) is less than the SELECTED kit number. In the case of the first pass in which the first kit is processed, the SELECTED variable would be 1, and in the case given above where the RUNNING TOTAL (2) equals 1, and the answer at Step 211 would be thus be "no". On the other hand, where the result of the inquiry at Step 211 is positive, the process proceeds to Step 212 where an another inquiry is made as to whether the 1550/1625 WDM pointer is currently at the lowest insertion loss value. In the case where the answer is "no", the process proceeds to Step 213 where the component pointer is moved to the parts having the next lowest insertion loss value. On the other hand, in the case where the pointer is at the lowest insertion loss value, the component pointer is reset at Step 215 to the highest acceptable insertion loss value. In either case, the RUNNING TOTAL (2) variable is incremented by 1, and the inquiry of Step 211 is repeated.

In the case where the result of the inquiry at Step 211 is negative, i.e., where the RUNNING TOTAL (1) is less than SELECTED, the oldest 1550/1625 WDM (i.e., the 1500/1625 WDM having the lowest Find Number) of the current pointer is selected at Step 216. This is the selected 1550/1625 WDM of the first stage of the SELECTED kit.

At Step 126, a target value for the Stage 2 isolator is calculated by subtracting the insertion loss value of the selected 1550/1625 WDM from the Stage 2 insertion loss budget (the STAGE LIMIT). Then, at Step 218, an isolator is located within the temporary table having an insertion loss equal to the isolator target value. If no such isolator exists, then the next lowest insertion loss value is used in locating an isolator.

At this point, the 1550/1625 WDM and the isolator of Stage 2 have been selected. These two components are then flagged in the temporary table at Step 219 to prevent reuse, and after reducing the available count for each part based on the selected insertion losses at Step 220, the process for Stage 2 is completed.

The Stage 3 process is shown by Steps 301–337, and is for selecting the tap 101, the isolator 102 and the 1480 WDM 103 of FIG. 1. With the exceptions of the Stage 3 variable designations and the 1480 WDM in place of the 980 WDM, Steps 301–337 of the Stage 3 process are respectively the same as Steps 101–137 of the Stage 1 process, and thus a detailed explanation will not be repeated here.

After selecting the Stage 3 components, an inquiry is then made at Step 401 as to whether the SELECTED variable denoting the present kit number equals the required number of kits. If not, the SELECTED variable is incremented by 1 at Step 402, and the process loops back to Step 101 for selection of the component parts of the next kit. On the other hand, if all kits have been processed, the selected parts are removed from the inventory database at Step 403, and a list of selected parts for each kit is printed at Step 404, which ends the process.

Figure 7:
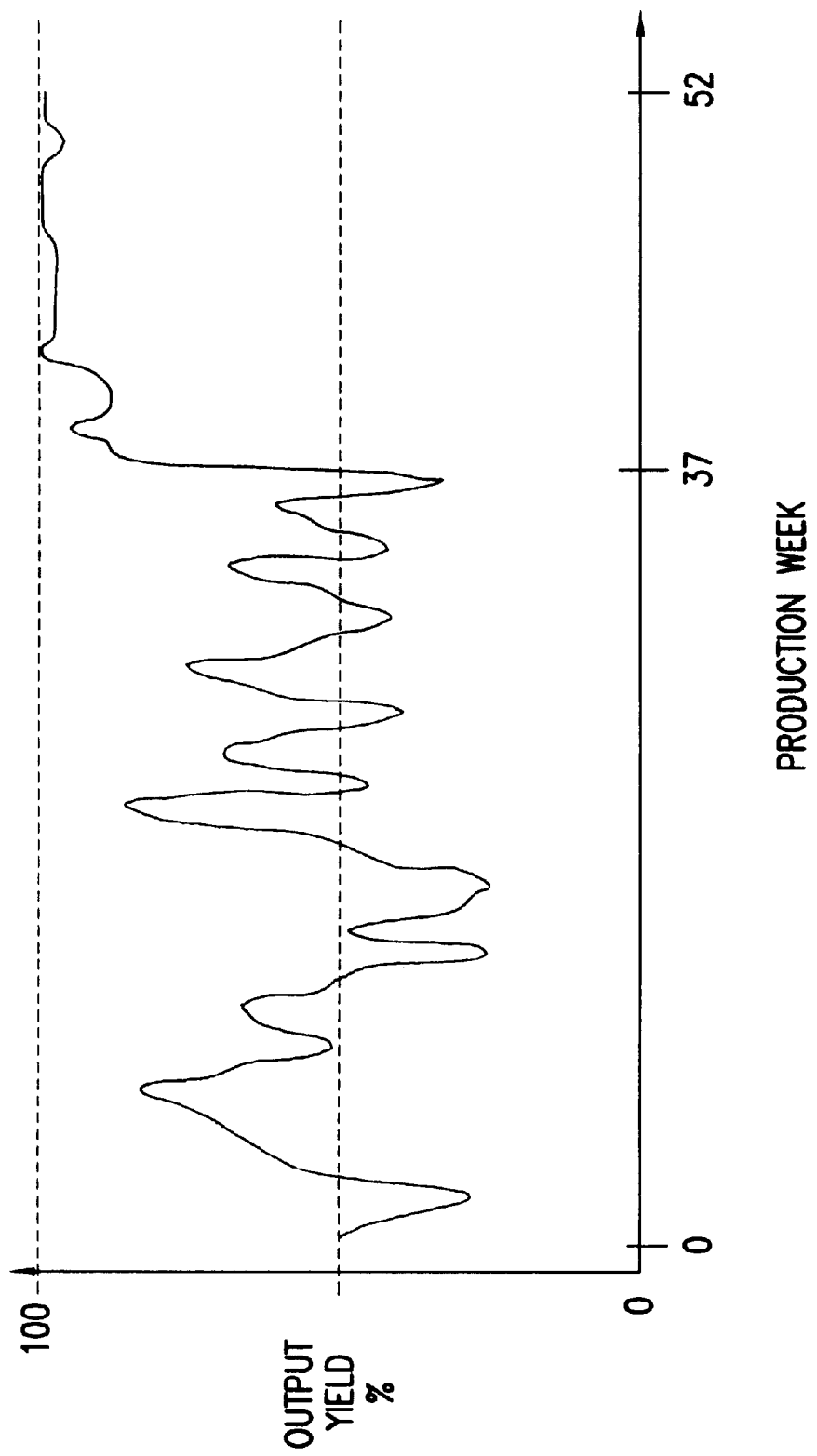
FIG. 7 is a bar graph showing actual device yields obtain by application of the present invention.

As mentioned above, the present invention results in an increased utilization efficiency of the component parts. In addition, as demonstrated in FIG. 7, the device yields are increased. FIG. 7 is a bar graph showing actual optical amplifier output yields, in which process of FIGS. 6(*a*)–6(*k*) were implemented for weeks 35V through 51V. As is clearly shown in FIG. 7, there was a marked improvement in device yields resulting from application of the present invention.

In addition, the invention provide several other advantages. For example, rational consideration of the selected performance parameter, such as insertion loss, allows for the manufacture of multiple device having closely similar overall performance characteristics. Also, by way of the invention, the successful assembly of amplifier kits is enhanced by dynamic replenishing of inventory supplies according to database updates. Similarly, the invention may provide for the automatic early warning of a depleted inventory based on the performance parameter distribution of the existing inventory.

Although preferred embodiments of the present invention have been described in detail hereinabove, it should be clearly understood that many variations and/or modifications of the basic inventive concepts herein taught, which may appear to those skilled in the art, will still fall within the spirit and scope of the present invention as defined in the appended claims and their equivalents.

What is claimed is:

1. A computer-implemented method for automatically selecting component parts for assembly of a device from among a supply of available component parts, each component part having a performance parameter associated therewith, said method comprising:

storing in a database memory component part data for each component part of the supply of available component parts, the component part data being in a computer readable format and indicative of a type of each part and the performance parameter of each part;

retrieving from said database memory the component part data for a plurality of the available component parts;

sorting the component part data retrieved from the database memory according to at least the performance parameter of each retrieved component part data;

selecting at least one component part among the sorted component part data based on a preset parameter; and identifying at least one remaining component part among the sorted component part data based on the performance parameter of the at least one component part and the performance parameter of the at least one remaining component part, the at least one component part and the at least one remaining component part being selected for assembly of the device; wherein said retrieving, said sorting, said selecting and said identifying are automatically carried out by a programmed computer responsive to an input instruction of a user, wherein said identifying at least one remaining component part includes comparing a specified overall performance parameter of the device to be assembled and the performance parameter of the at least one component part to determine a difference therebetween, and selecting the at least one remaining component part according to said difference, the component part data is further indicative of a batch number of each component part in the supply of available component parts, and wherein said retrieving from said database memory includes retrieving the component part data of a first batch number of each type of component part of the device to be assembled, determining whether a sufficient number of each type of component parts associated with each first batch number, and retrieving the component part data of at least one additional second batch number in the event that there is an insufficient number of component parts associated with each first batch number.

2. A computer-implemented method as claimed in claim 1, where said identifying at least one remaining component part further includes selecting the at least one remaining component part according to a distribution of the performance parameters of the plurality of the available component parts.

3. A computer-implemented method as claimed in claim 2, further comprising said programmed computer generating a listing of the at least one component part and the at least one remaining component part selected for assembly of the device, and updating the database memory to reflect removal of the at least one component part and the at least one remaining component part from the supply of available component parts.

4. A computer-implemented method as claimed in claim 2, further comprising said programmed computer generating a listing of the at least one component part and the at least one remaining component part selected for assembly of the device, and updating the database memory to reflect removal of the at least one component part and the at least one remaining component part from the supply of available component parts.

5. A computer-implemented method as claimed in claim 2, wherein the device to be assembled includes multiple assembly stages each having a plurality of component parts, and wherein said method further includes said programmed computer repeating said selecting and said identifying for each assembly stage of the device.

6. A computer-implemented method as claimed in claim 4, wherein the device to be assembled includes multiple assembly stages each having a plurality of component parts, and wherein said method further includes said programmed computer repeating said selecting and said identifying for each assembly stage of the device.

7. A computer-implemented method as claimed in claim 2, wherein the components parts are passive optical components, and wherein the performance parameter is insertion loss.

8. A computer-implemented method as claimed in claim 6, wherein the components parts are passive optical components, and wherein the performance parameter is insertion loss.

9. A computer-implemented method as claimed in claim 7, wherein the device to be assembled is an optical amplifier, and wherein the component parts include taps, isolators and wave division multiplexers.

10. A computer-implemented method as claimed in claim 7, wherein the device to be assembled is an optical add-drop module, and wherein the component parts include taps, isolators, couplers and wave division multiplexers.

11. An apparatus for automatically selecting component parts for assembly of a device from among a supply of available component parts, each component part having a performance parameter associated therewith, said apparatus comprising:

a database memory having storing therein component part data for each component part of the supply of available component parts, the component part data being in a computer readable format and indicative of a type of each part and the performance parameter of each part;

a programmed computer, responsive to an input instruction from a user and operatively coupled to said database memory, for retrieving from said database memory the component part data for a plurality of the available component parts, sorting the component part data retrieved from the database memory according to at least the performance parameter of each retrieved component part data, selecting at least one component part among the sorted component part data based on a preset parameter, and identifying at least one remaining component part among the sorted component part data based on the performance parameter of the at least one component part and the performance parameter of the at least one remaining component part, the at least one component part and the at least one remaining component part being selected for assembly of the device, wherein said programmed computer identifies the at least one remaining component part by comparing a specified overall performance parameter of the device to be assembled and the performance parameter of the at least one component part to determine a difference therebetween, and selecting the at least one remaining component part according to said difference, the component part data is further indicative of a batch number of each component part in the supply of available component parts, and wherein said programmed computer retrieves from said database memory the component part data for a plurality of the available component parts by retrieving the component part data of a first batch number of each type of component part of the device to be assembled, determining whether a sufficient number of each type of component parts is associated with each first batch number, and retrieving the component part data of at least one additional second batch number in the event that there is an insufficient number of component parts associated with each first batch number.

12. An apparatus as claimed in claim 11, where said programmed computer identifies the at least one remaining component part further by selecting the at least one remaining component part according to a distribution of the performance parameters of the plurality of the available component parts.

13. An apparatus as claimed in claim 11, wherein said programmed computer is further for generating a listing of the at least one component part and the at least one remaining component part selected for assembly of the device, and updating the database memory to reflect removal of the at least one component part and the at least one remaining component part from the supply of available component parts.

14. An apparatus as claimed in claim 11, wherein said programmed computer is further for generating a listing of the at least one component part and the at least one remaining component part selected for assembly of the device, and updating the database memory to reflect removal of the at least one component part and the at least one remaining component part from the supply of available component parts.

15. An apparatus as claimed in claim 11, wherein the device to be assembled includes multiple assembly stages each having a plurality of component parts, and wherein said programmed computer is further for repeating the selecting of at least one component part among the sorted plurality of the available component parts and the identifying of at least one remaining component part among the sorted plurality of the available component parts for each assembly stage of the device.

16. An apparatus as claimed in claim 15, wherein the device to be assembled includes multiple assembly stages each having a plurality of component parts, and wherein said programmed computer is further for repeating the selecting of at least one component part among the sorted plurality of the available component parts and the identifying of at least one remaining component part among the sorted plurality of the available component parts for each assembly stage of the device.

17. An apparatus as claimed in claim 11, wherein the components parts are passive optical components, and wherein the performance parameter is insertion loss.

18. An apparatus as claimed in claim 16, wherein the components parts are passive optical components, and wherein the performance parameter is insertion loss.

19. An apparatus as claimed in claim 17, wherein the device to be assembled is an optical amplifier, and wherein the component parts include taps, isolators and wave division multiplexers.

20. An apparatus as claimed in claim 17, wherein the device to be assembled is an optical add-drop module, and wherein the component parts include taps, isolators, couplers and wave division multiplexers.

* * * * *